(12) United States Patent
Coots

(10) Patent No.: US 8,316,774 B1
(45) Date of Patent: Nov. 27, 2012

(54) AUXILIARY DRIVE SYSTEM FOR A HIGH-RAIL VEHICLE

(75) Inventor: William R. Coots, Lebanon Junction, KY (US)

(73) Assignee: B & B Metals, Inc., Shepherdsville, KY (US)

(*) Notice: Subject to any disclaimer, the term of this patent is extended or adjusted under 35 U.S.C. 154(b) by 278 days.

(21) Appl. No.: 12/497,017

(22) Filed: Jul. 2, 2009

(51) Int. Cl.
B61C 11/00 (2006.01)
B61F 1/00 (2006.01)
B62D 1/24 (2006.01)

(52) U.S. Cl. ............ 105/72.2; 105/215.2; 180/320

(58) Field of Classification Search .......... 105/72.2, 105/215.2; 180/53.1, 53.2, 53.4, 53.6, 321
See application file for complete search history.

(56) References Cited

U.S. PATENT DOCUMENTS

| | | | |
|---|---|---|---|
| 567,232 A | 9/1896 | Greenshield | |
| 594,731 A | 11/1897 | Dowe | |
| 636,702 A | 11/1899 | Wilton | |
| 703,755 A | 7/1902 | Bender | |
| 712,167 A | 10/1902 | Wood | |
| 832,332 A | 10/1906 | McConnell | |
| 832,333 A | 10/1906 | McConnell | |
| 832,334 A | 10/1906 | McConnell | |
| 1,593,423 A | 7/1926 | Bradley | |
| 1,937,532 A | 12/1933 | Ronk | |
| 2,157,651 A | 5/1939 | Fildes | |
| 2,762,313 A | 9/1956 | Sublett | |
| 2,959,260 A | 11/1960 | Johnson et al. | |
| 3,019,742 A * | 2/1962 | Knox | 105/72.2 |
| 3,282,506 A | 11/1966 | Holstein | |
| 3,344,747 A | 10/1967 | Keller | |
| 3,877,390 A | 4/1975 | Wallace | |
| 3,943,858 A | 3/1976 | Dieringer et al. | |
| 4,048,925 A | 9/1977 | Storm | |
| 4,168,771 A | 9/1979 | Krivec | |
| 4,241,663 A | 12/1980 | Lund et al. | |
| 4,468,966 A | 9/1984 | Bradshaw | |
| 4,520,735 A | 6/1985 | Field | |
| 4,534,297 A * | 8/1985 | Johnson, Sr. | 105/90.2 |
| 4,631,639 A | 12/1986 | Biraud | |
| 4,686,909 A | 8/1987 | Burleson | |
| 4,691,639 A | 9/1987 | Holley | |
| 4,784,063 A | 11/1988 | Theurer et al. | |

(Continued)

FOREIGN PATENT DOCUMENTS

GB 2 052 406 A 1/1981

*Primary Examiner* — S. Joseph Morano
*Assistant Examiner* — R. J. McCarry, Jr.
(74) *Attorney, Agent, or Firm* — Middleton Reutlinger; James E. Cole

(57) ABSTRACT

An auxiliary drive system for a high-rail vehicle comprises a high-rail vehicle having a first prime mover, a disengaged transmission, a chassis, a first set of on-road wheel assemblies and a second set of rail wheels, a cab for controlling the high-rail vehicle on road, a remote cab spaced from the primary cab, the remote cab allowing for control of the high-rail vehicle on railroad tracks, a secondary drive assembly comprising one of a hydraulic motor or an electric motor, a friction roller engaging one of the first set of on road wheel assemblies, the friction roller drivably engaging at least one of the first set of on road wheel assemblies and, the secondary drive assembly operable from the remote cab to move the friction roller and move the high-rail vehicle along the railroad tracks.

25 Claims, 18 Drawing Sheets

U.S. PATENT DOCUMENTS

| | | | |
|---|---|---|---|
| 4,828,452 A * | 5/1989 | Bolitho | 414/718 |
| 4,923,355 A | 5/1990 | Mancini | |
| 4,942,822 A | 7/1990 | Cotic | |
| 4,974,518 A | 12/1990 | Cotic et al. | |
| 5,103,740 A | 4/1992 | Masse | |
| 5,131,798 A | 7/1992 | Bell et al. | |
| 5,168,627 A | 12/1992 | Owen | |
| 5,592,883 A | 1/1997 | Andress, III | |
| 5,655,455 A | 8/1997 | Smith | |
| 5,802,980 A | 9/1998 | Hofmiller | |
| 6,012,396 A | 1/2000 | Schulz | |
| 6,101,953 A * | 8/2000 | Spata | 105/215.2 |
| 6,129,026 A | 10/2000 | LeCroy | |
| 6,134,775 A | 10/2000 | Castillo | |
| 6,199,485 B1 | 3/2001 | Pyle | |
| 6,352,035 B1 * | 3/2002 | Kashiwase et al. | 105/72.2 |
| 6,807,909 B1 | 10/2004 | Coots | |
| 7,082,879 B2 | 8/2006 | Alt | |
| 7,201,106 B2 | 4/2007 | Whiston et al. | |
| 7,406,919 B2 * | 8/2008 | Coots | 105/215.2 |
| 7,827,916 B2 | 11/2010 | Coots, Jr. | |
| 2002/0078853 A1 | 6/2002 | Holmes et al. | |
| 2005/0217532 A1 * | 10/2005 | Conneally | 105/215.1 |

\* cited by examiner

AUXILIARY DRIVE SYSTEM FOR A HIGH-RAIL VEHICLE

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Invention

The present invention relates to a self-propel system for driving a high-rail vehicle along railroad tracks. More specifically, the present invention relates to an apparatus for driving the vehicle along railroad tracks from a location remote from the cab eliminating the need for an additional operator during railroad track maintenance as well as a novel system for depositing tie plates along the track.

2. Description of the Related Art

Railroad tracks generally consist of two parallel steel rails, which are positioned on transverse railroad ties. Railroad ties are normally laid on a bed of coarse stone known as ballast, which combines resilience, some amount of flexibility, and good drainage characteristics. Railroad ties spread the load from the rails over the ballast, and substrate below, and also serve to hold the rails a fixed distance apart. The railroad ties are generally spaced apart a distance of about twenty-two inches on center although the distance may vary. On an upper surface of the railroad tie, is a tie plate or base plate. The tie plate connects the rail and the tie. Fasteners, such as spikes, screws or the like are often driven through a hole in the tie plate to hold the rail. Alternatively the rails may be clipped to the tie plates.

The steel rails can carry heavier loads than any other material. The rails generally have a foot, a web extending upwardly from the foot and a head. Additionally, the rails are spaced apart a preselected distance corresponding to wheel spacing of trains. The preselected distance between rails is known in the art as the gauge distance.

Over time, deterioration and repeated loading stress requires that the railroad tie plates, as well as other components, be replaced during maintenance. Various machines which deliver and position railroad tie plates along a railroad track bed have been suggested. One problem with these devices is that they require multiple workers to operate. For example, one person is required to drive the vehicle along the tracks, another person is required to operate a crane to retrieve tie plates, and at least two other men are typically required to position and orient the tie plates on the feed system. Since profitability in this work is related to the number of men required to perform the job, a decrease in man power leads to increased profits, assuming no change in tie plates distributed.

It would be highly desirable to provide a device which allows for elimination of one or more workers on railroad maintenance crew, without a decrease in production or the number of tie plates distributed. It would also be desirable to provide a system which allows for control of the high-rail vehicle along a railroad track from a remote position on the vehicle, away from the cab, where an operator can also perform other tasks.

Another problem with current tie plate distribution systems, is that various systems rely on timing or distance measurements to distribute tie plates. For example, the prior art devices may utilize geared timing mechanisms which deposit tie plates based on a distance traveled. The gears or sprockets need only be adjusted when distributing tie plates on a track having different tie spacing. These assemblies for depositing railroad ties use measurement or timing mechanisms to deposit tie plates regardless of whether the actual railroad tie is beneath the distribution system. Over long distances or periods of time, tie plates may not be deposited on the ties, but instead between them. This is due to mechanical tolerances which are magnified over periods of time or distance and therefore require adjustment when such timing is off.

It would be desirable to positively detect the location of an existing tie plate and cause the depositing of a replacement tie plate at that location along the railroad track, rather than approximate a position of a railroad tie by distance or timing.

One additional problem with tie plate distribution systems is that of conveyor systems which receive tie plates from the high-rail vehicle and deposit them on the railroad ties. These conveyors are typically formed of conveyor belts or roller conveyor systems. Over time, belts and idler rollers may wear, become soiled with dirt and contaminates, or break such that conveying is inhibited which ultimately decreases efficiency and therefore increases costs in railroad maintenance.

It would be desirable to create a tie plate slide which does not require the use of belts or rollers that may become damaged and require maintenance during the life of the equipment.

SUMMARY OF THE INVENTION

An auxiliary drive system for a high-rail vehicle comprises a high-rail vehicle having a first prime mover, a disengaged transmission, a chassis, a first set of on-road wheel assemblies and a second set of rail wheels, a cab for controlling the high-rail vehicle on road, a remote cab spaced from the primary cab, the remote cab allowing for control of the high-rail vehicle on railroad tracks, a secondary drive assembly comprising one of a hydraulic motor or an electric motor, a friction roller engaging one of the first set of on road wheel assemblies, the friction roller drivably engaging at least one of the first set of on road wheel assemblies and, the secondary drive assembly operable from the remote cab to move the friction roller and move the high-rail vehicle along the railroad tracks. The auxiliary drive system further comprising a generator when the secondary drive assembly comprises an electric motor. The auxiliary drive system further comprising a friction roller slidably engageable with one of the first on-road wheel assemblies. The auxiliary drive system wherein the one of the hydraulic or electric motor directly engages the friction roller. The auxiliary drive system wherein the secondary drive assembly further comprises a transmission. The auxiliary drive system wherein the transmission is operably connecting the friction roller and the one of a hydraulic or an electric motor. The auxiliary drive system wherein the transmission is a chain drive. The auxiliary drive system wherein the transmission is a gear drive. The auxiliary drive system wherein the transmission is a belt drive.

An auxiliary drive system comprises a high-rail vehicle having a cab, a chassis, a plurality of wheels disposed on the chassis, a transmission and a prime mover for highway operation, a remote cab, spaced from the primary cab for controlling the high-rail vehicle when the vehicle is disposed on a railroad, an auxiliary drive assembly having one of a hydraulic motor or an electric motor, the one of a hydraulic or electric motor driving at least one of the plurality of wheels when the transmission is disengaged from the engine; and, a plurality of rail wheels depending from the chassis. The auxiliary drive system wherein the one of a hydraulic motor or electric motor is directly connected to an axle connected to said at least one of said plurality of wheels. The auxiliary drive system wherein the one of a hydraulic motor or electric motor is spaced from an axle connected to the at least one of the plurality of wheels. The auxiliary drive system wherein the one of a hydraulic or electric motor is connected by a transmission to one of the axle or one of the plurality of wheels. The auxiliary drive system wherein the transmission is one of a chain drive, a belt drive, a gear drive, and a fluid drive. The auxiliary drive system of further comprising a differential having a power take off. The auxiliary drive system wherein the one of a hydraulic motor or an electric motor is connected to the power take off. The auxiliary drive system wherein the one of a hydraulic motor or electric motor is driving the at least one of the plurality of wheels. The auxiliary drive system further comprising a friction roller. The auxiliary drive system wherein the friction roller is operably connected to the one of a hydraulic motor or electric motor. The auxiliary drive wherein the friction roller is directly connected to the one of a hydraulic motor or electric motor. The auxiliary drive wherein the friction roller is operably connected to the one of a hydraulic motor or electric motor by a secondary transmission. The auxiliary drive system wherein the secondary transmission is one of a belt drive, a gear drive, or a chain drive.

An auxiliary drive system comprises a high-rail vehicle having a prime mover, a chassis, a first plurality of on-road wheels, a second plurality of rail wheels, a first transmission engageable between the prime mover and the first plurality of wheels, a secondary drive assembly for driving the high-rail vehicle along railroad tracks, the secondary drive assembly controllable from a remote position on the high-rail vehicle, the secondary drive assembly comprising one of a hydraulic motor and an electric motor and, the secondary drive assembly in direct engagement or indirect engagement with one of an on-road wheel assembly, an axle or a drive train of the high-rail vehicle. The auxiliary drive system wherein the secondary drive assembly further comprises a friction roller movable from a first position to a second position to engage or disengage the wheel assembly. The auxiliary drive system wherein the secondary drive assembly further comprises a secondary drive transmission operably connecting the one of a hydraulic motor and the electric motor to the friction roller. The auxiliary drive system wherein the secondary drive transmission is one of a chain drive, a belt drive, and a gear drive.

A tie plate slide structure comprises a tie plate slide frame having a first frame member and a second opposed frame member, the first frame member and the second frame member extending substantially parallel from a first upper end to a second lower end, a substantially central support structure extending from the first upper end to the second lower end, the substantially central support disposed between the first frame member and the second frame member, a support assembly having first and second rail wheels depending from a lower side of the tie plate frame, a gate assembly disposed near the lower end of the tie plate slide frame to discharge tie plates slidably moving downwardly along the first and second frame members and the central support structure. The tie plate slide structure wherein the first frame member and the second opposed frame member including a first frame structure and a second frame structure, respectively. The tie plate slide structure wherein the first frame structure and the second frame structure supporting ends of the tie plates. The tie plate slide structure wherein the first frame structure, the second frame structure and the central support have substantially equal elevations. The tie plate slide structure wherein the first frame structure, the second frame structure and the central support defining three points of contact on the tie plates. The tie plate slide structure further comprising a friction inhibiting additive disposed on the first frame member and the second frame member. The tie plate slide structure wherein the gate assembly allows for a linear discharge path aligned with the tie plate slide frame 70. The tie plate slide structure wherein the gate assembly discharges the tie plates at an angle to the first and second frame members. The tie plate slide structure wherein the gate assembly is hydraulically actuated. The tie plate slide structure wherein the gate assembly is electrically actuated. The tie plate slide structure wherein the gate assembly is pneumatically actuated. The tie plate slide structure wherein the gate assembly comprises a tire assembly rotatably supported at a lower end of the tie plate slide. The tie plate slide structure wherein the tire assembly engages a tie plate disposed on the frame to either retain the tie plate or discharge the tie plate. The tie plate slide structure wherein the tire assembly is rotatably driven by a motor. The tie plate structure wherein the motor is one of hydraulic or electric. The tie plate structure wherein the gate assembly further comprises a cylinder having a piston which engages or disengages the tie plates to discharge or retain the tie plates on the tie plate slide frame. The tie plate structure wherein the gate assembly comprising a stop and a cylinder having a piston which pushes tie plates from the lowermost end of the tie plate slide.

A tie plate slide structure comprises a tie plate slide having a first frame member and a second frame member extending from an upper end to a lower end and spaced apart a preselected distance to define a slide path which slidably receives tie plates, a central support extending between and parallel to the first frame member and the second frame member and spaced from the first and second frame members, the first frame member having a first slide support surface and the second frame member having a second slide support surface, a gate assembly disposed at the lower end of the tie plate slide and actuatable through one of rotary or linear motion to discharge the tie plates sequentially. The tie plate slide structure wherein the slide support surfaces have a friction inhibiting material in a location of engagement with the tie plates. The tie plate slide structure wherein the central support is one of an I-beam, at least one angle iron, a T-structure, or a plate. The tie plate slide structure wherein the central support engages the tie plates along one of a surface or an edge. The tie plate slide structure further comprising a sensor assembly for actuating the gate assembly. The tie plate slide structure wherein the sensor assembly detecting at least one of a railroad tie, an in-service tie plate, a speed of movement of said tie plate structure, a distance moved, a distinction between tie plate and tie, a distinction between tie and ballast or a combination thereof.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

DETAILED DESCRIPTION

Figure 1:
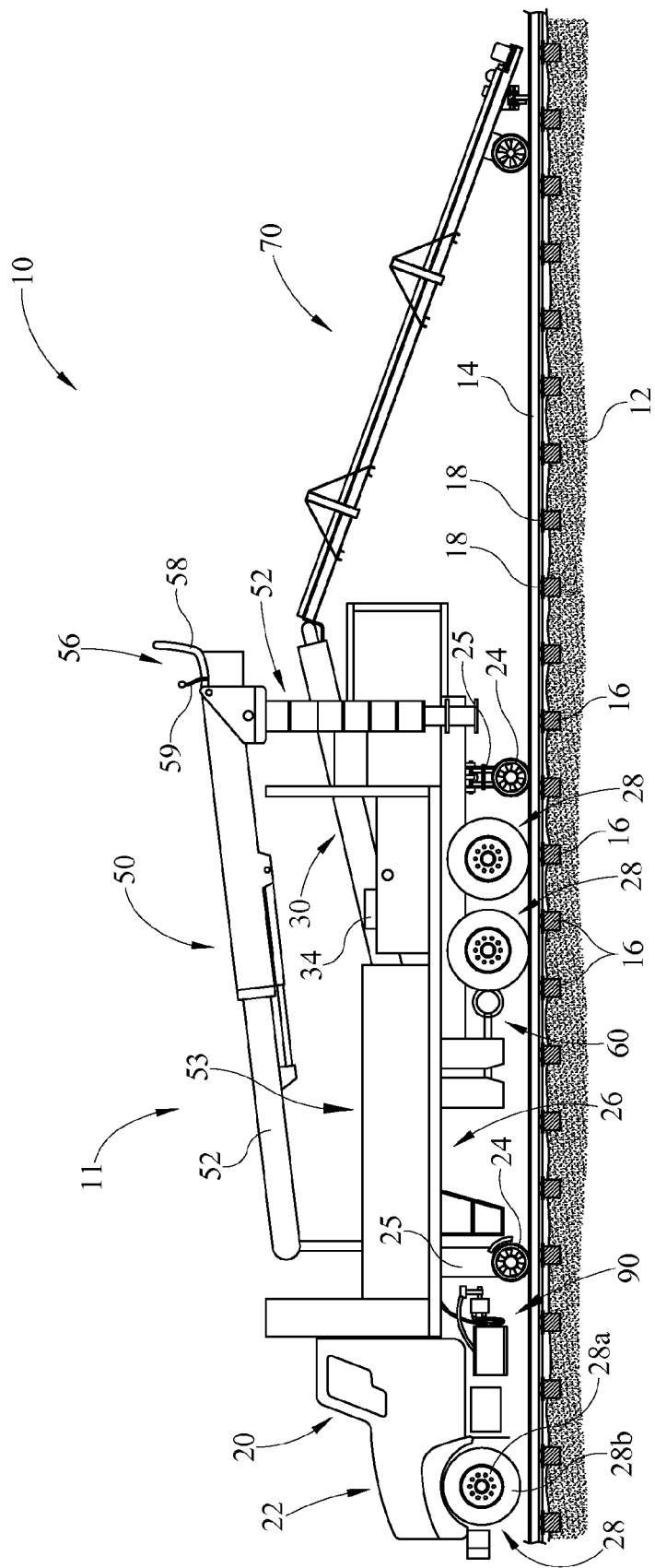
FIG. 1 is a side view of a tie plate distribution system including a high-rail vehicle and a tie plate slide.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Furthermore, and as described in subsequent paragraphs, the specific mechanical configurations illustrated in the drawings are intended to exemplify embodiments of the invention and that other alternative mechanical configurations are possible.

Referring now in detail to the drawings, wherein like numerals indicate like elements throughout the several views, there are shown in FIGS. 1-18 various aspects of a tie plate distribution system. The tie plate distribution system includes a self-propel or auxiliary drive system which allows control of the high-rail vehicle along the railroad tracks from a location remote from a cab, so that one operator may drive the vehicle along the tracks as well as control other functions of the high-rail vehicle. This eliminates one additional man from a railroad maintenance crew and therefore decreases the labor costs associated with such railroad maintenance. Additionally, the tie-plate distribution system includes an assembly for detecting railroad ties and distributing tie plates upon detection of each railroad tie. Finally, the system further comprises a new tie plate slide rail structure which requires less maintenance and is more rugged than existing systems and costs less to manufacture and operate.

Figure 2:
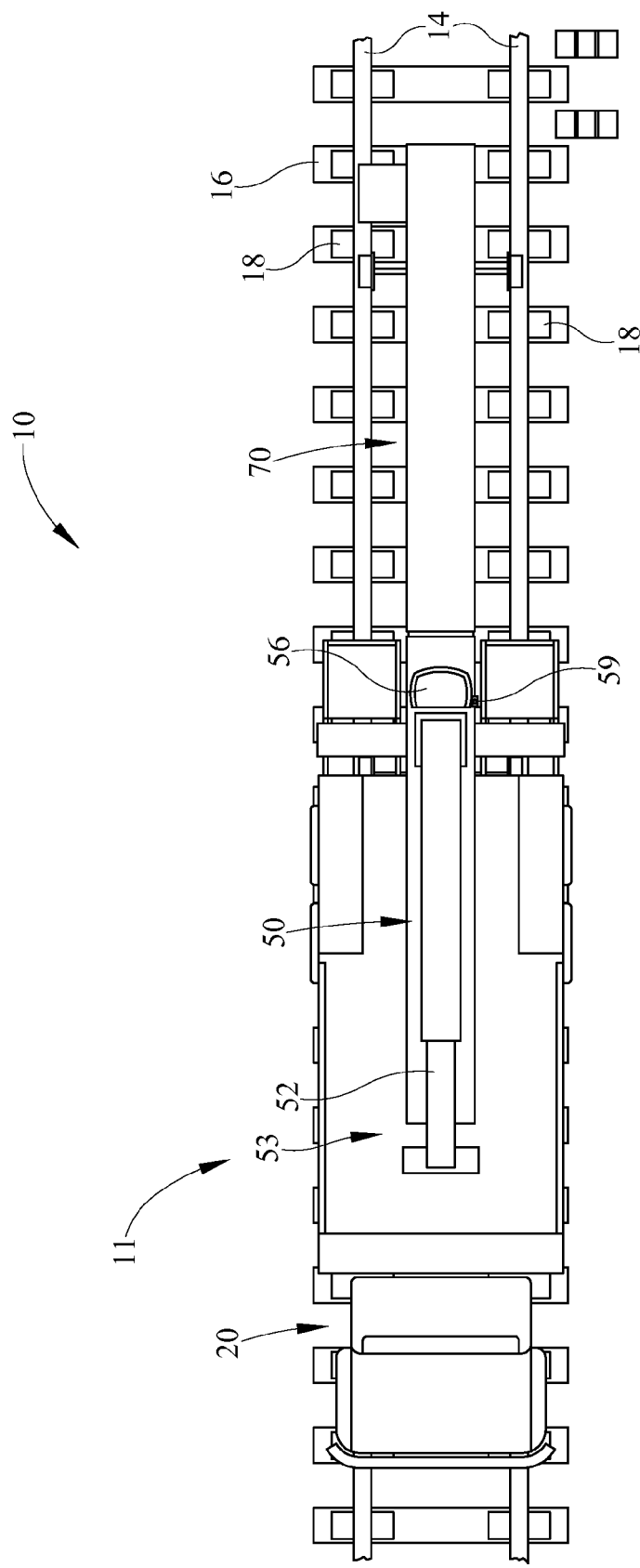
FIG. 2 is a top view of the tie plate distribution system of FIG. 1.

Referring initially to FIGS. 1 and 2, a side view and a top view of a feed conveyor assembly are depicted, respectively. A tie plate distribution system 10 is partially shown located on track rails 14. Beneath the rails 14, a ballast 12 provides a substrate upon which a plurality of railroad ties 16 are disposed. The ballast 12 may be formed of rocks or other material which provides a stable base and allows for proper drainage. Further, the ballast 12 may have an upper elevation which positions the railroad tracks 14 at a height above known flood plains. The railroad ties 16 are generally positioned about 22 inches apart, as is known in the art however, alternative spacing may be utilized. The railroad ties 16 are generally rectangular having a square cross-section as shown in FIG. 1 although such shape is not necessary. Disposed on an upper surface of each railroad tie 16 is at least one tie plate 18. In the exemplary embodiment, two tie plates 18 are positioned on each tie 16 corresponding to the two rails 14. The tie plates 18 are anchored to the railroad ties 16 and provide a place for positioning of the railroad track 14. Although a single track is shown in the side view, as one skilled in the art will understand two rails 14 are laid in parallel fashion and spaced apart at a preselected gauge distance providing the railroad track system.

The high-rail or carrier vehicle 11 as shown in FIG. 1 is also usable on public roads or may be a converted railroad freight or may be a converted flatbed or boxcar or other non-powered device which is pulled by a powered vehicle and usable both on-road and on railway. The high-rail vehicle 11 of FIGS. 1 and 2 employs a prime mover 22, such as a gasoline or diesel engine to power the vehicle. The prime mover 22 is generally located beneath the hood, as will be understood by one skilled in the art. A transmission and drive train transmit torque to at least one wheel assembly 28 to propel the vehicle 11 as will be understood by one skilled in the art. The vehicle 11 further comprises a cab 20 wherein an operator may drive the vehicle 10 on-road, on to the rails 14 and off of the rails 14. The high rail vehicle 10 further comprises a chassis 26 which is supported by on-road wheel assemblies 28, each including at least wheels 28a and tires 28b. The chassis 26 extends from a front area of the vehicle 10 toward a rear area of the vehicle 10. The high-rail vehicle 10 further comprises a plurality of railway wheels 24 for supporting movement of the carrier vehicle 10 along the rail track 14.

Figure 9:
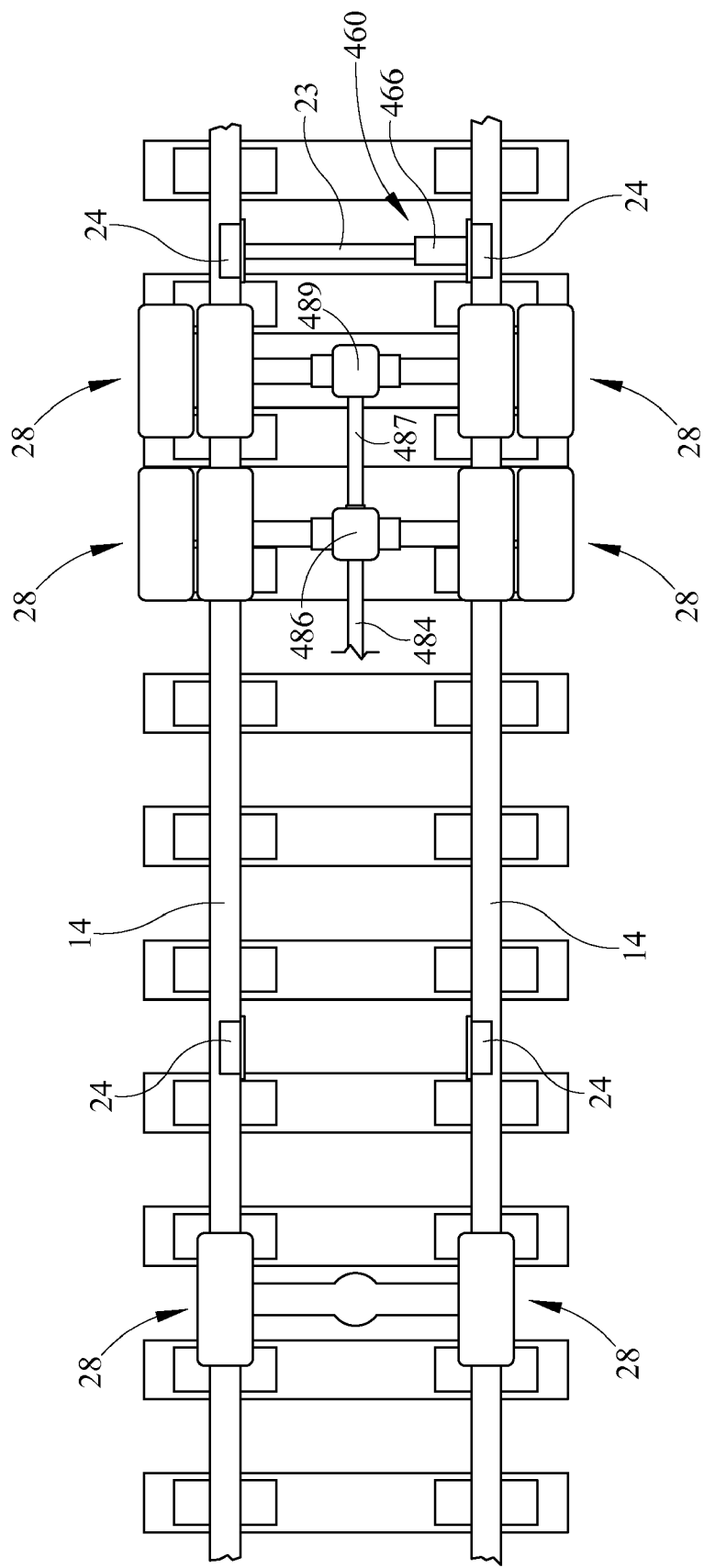
FIG. 9 is a top schematic view of yet an additional alternative embodiment of a self-propel system for driving a high-rail vehicle along a railroad track.

The rail wheels 24 may be connected to a movable support structure 25 depending from the chassis 26. The rail wheels 24 are movable between a first position and a second position to either engage or disengage the track rail 14. The movement may be linear or arcuate toward or away from the track rail 14 and the rail wheels 24 are pivotally connected to the support structure 25 and/or an axle 23, for example (FIG. 9). According to a first position, the wheels 24 are engaging the rails 14 to guide and/or drive the high-rail vehicle 11 along the rails 14. According to a second position, the wheels 24 are moved away from the track rail 14 so that the high-rail vehicle 10 can drive off of the rails 14, on to the rails 14 or along a roadway.

Along an upper area of the high-rail vehicle 10 is a conveyor 30 which receives the tie plates 18 stored on the high-rail vehicle 10 for positioning along the plurality of railroad ties 16 with respect to the direction of tie plate feeding, the conveyor 30 may be inclined, as shown in the exemplary embodiment, declined, or flat. The tie plates 18 may be manually placed on the conveyor 30 or fed by hopper, vibrating feeder, other material handling structure 50 or any combination thereof. Workers may also be positioned at one or more work stations on the vehicle 11 to position and orient the tie plates 18 on the conveyor 30 for improved feeding. The conveyor 30 delivers tie plates 18 to a tie plate slide 70 connected to a rear of the high-rail vehicle 11. The conveyor 30 may be embodied by various constructions which are not shown in detail such as a gravity feed roller conveyor, a belt conveyor or a gravity slide described further herein. For example, the conveyor 30 may be a belt type conveyor, or may include a plurality of idler rollers which feed the tie plates by the manual force applied by a worker on the carrier vehicle 10 or by a mover such as hydraulic cylinder-piston ram, pneumatic or electric powered ram to force the tie plates 18 along the conveyor 24. Alternatively, the conveyor 24 may also be a plurality of idler rollers or a gravity slide or chute formed of a planar material or a plurality of rails.

The prime mover 22 also provides power for hydraulic and electrical systems on the high-rail vehicle 11 as well as providing a power supply for the conveyor 30, described further herein. The prime mover 22 may provide power for driving the high-rail vehicle 10 via a hydraulic system 80 or alternatively the high-rail vehicle 11 may utilize an independent prime mover 34 for powering only the conveyors and other structures of the instant invention. For example, a generator 34 is disposed on the high-rail vehicle 11. The generator 34 provides a power source for powering an electric motor which is a component of a self-propel or auxiliary drive system 60. The generator 34 may also provide power, either electric or power for a hydraulic system, for structures such as gate and senior assemblies, on the tie plate slide 70 as well as a crane 50 on the high-rail vehicle 11.

The crane 50 is utilized to pick up tie plates 18 from a pile and move to a hopper generally indicated around 53, on the high-rail vehicle 11. The crane 50 includes a boom 52 which is movable, extendable and retractable and which is supported by a support structure 52. The boom 52 further includes a magnet to pick up multiple tie plates 18 and place in the hopper 53 from various preselected loading sources or sites. From the hopper 53, the tie plates 18 move to a position near the feed end of conveyor 30 for movement toward the tie plate slide 70. The tie plates 18 are re-oriented and moved onto the feed conveyor tie plate slide 70 either manually, by laborers, in an automated nature, or some combination thereto.

Near the upper portion of a crane support 52 is a remote control cab 56. The remote cab 56 may include a covered cab or merely an uncovered seat area 58 as well as a plurality of controls 59. The remote cab 56 allows for control of outriggers, the crane boom 52 as well as at least start, stop and throttle control for the self-propel system 60. By allowing control of the self-propel system 60, the remote cab 56 eliminates the need of a separate vehicle operator in the cab 20 when the high-rail vehicle 11 is positioned on the track rails 14. Further, the remote cab 56 eliminates the need for an operator to stop the vehicle 11 in order to move from operation of the crane 50 to operation in the cab 20.

Referring still to FIGS. 1 and 2, a tie-plate slide 70 extends from an upper position of the conveyor 30 toward a lower area near the railroad track 14. The tie plate slide 70 depends from a rear area of the high-rail vehicle 11, downwardly toward the railroad track 14 so that tie plates 18 are fed from the high rail vehicle 11 down the slide 70 to the ties 16. The tie plate slide 70 receives tie plates 18 from the conveyor 30 and disposes those tie plates 18 on the ties 16.

Figure 3:
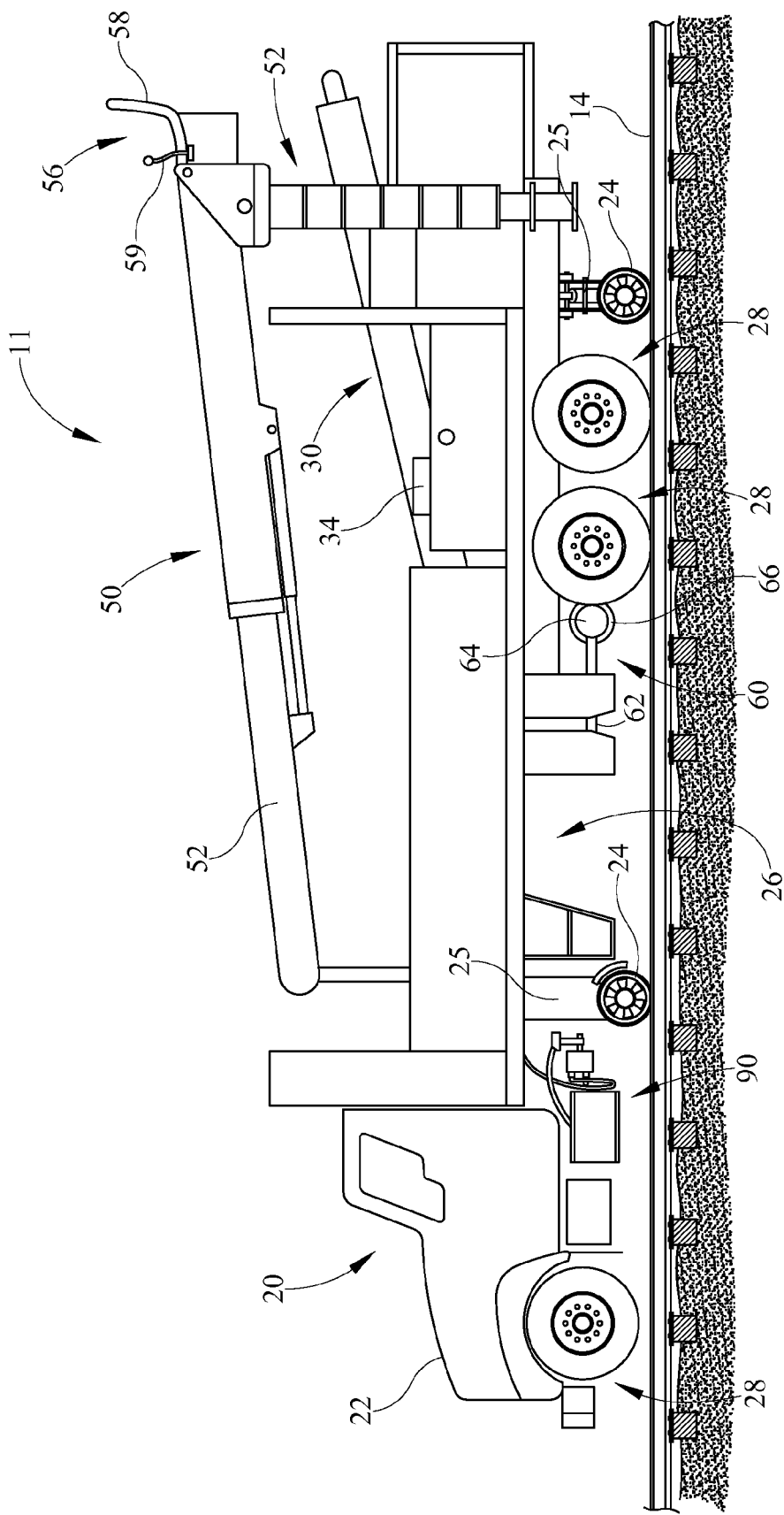
FIG. 3 is a side view of a first embodiment of a self-propel system for driving the high-rail vehicle along a railroad track.

Referring now to FIG. 3, a side view of the high-rail vehicle 11 is depicted. on the railroad tracks 14 having the wheel assemblies 28 aligned with the rails 14. Additionally, the rail wheels 24 are positioned engaging the rails or track 14. In this configuration, the wheel assemblies 28 are used to provide the driving force for the high-rail vehicle 11 while the rail wheels 24 guide the vehicle on the tracks 14. Additionally, the vehicle 11 is arranged so that the front wheel assembly 29, near the cab 20, is elevated off of the rails 14 and therefore cannot steer the high-rail vehicle 11 off of the tracks. In order to accomplish this, the rail wheels 24 are moved downwardly to at least partially support the high-rail vehicle 11. The remainder of weight of the vehicle 11 is supported by the two or more rear wheel assemblies 28.

Depending from the chassis 26 is the self propel system 60. According to the exemplary embodiment shown in FIG. 3, the self propel system includes a slide bar 62 which provides for engagement or disengagement of a friction roller or wheel 64 with one of the wheel assemblies 28. The slide bar 62 may slide or otherwise move relative to the chassis 26 or other structure to either engage or disengage the friction roller 64 with the wheel assemblies 28. The friction roller 64 is axially aligned with and in direct engagement with an electric motor 66. The upper surface of the chassis 26 includes an electric generator 34 which powers the electric motor 66. The rotation of the electric motor 66 causes rotation of the friction roller 64. In turn, this causes for rotation of the wheel assembly 28 which is an engagement with at least one railroad track 14 causing movement of the high-rail vehicle 11.

Since the high-rail vehicle 11 is not driven on the rails 14 by the prime mover 22, and in order to illuminate one operator from the system, an operator sits in the remote cab 56 and is provided with at least one control 59. However, the remote cab 56 may also include a start control, a stop control or brake, and a throttle control in order to drive the high-rail vehicle 11 along the rails 14 and may also include control to engage or disengage the friction roller 164 from wheel assembly 28. Since the front wheel assembly 28 is off the track, no steering functionality is needed and this allows the high-rail vehicle 11 to be operated from this remote cab area 56. Additionally, the remote cab 56 may also be utilized to operate the crane 50. Thus, as one skilled in the art will glean from this teaching, an operator in this remote cab 56 can operate both the crane 50 and drive the high-rail vehicle 11 along the track, and this eliminates the need for an additional person to operate the high-rail vehicle 11 from the cab 20. This also eliminates the need for one operator to stop the vehicle 11 and move back-and-forth between the cab 20 and the remote cab 56.

Figure 4:
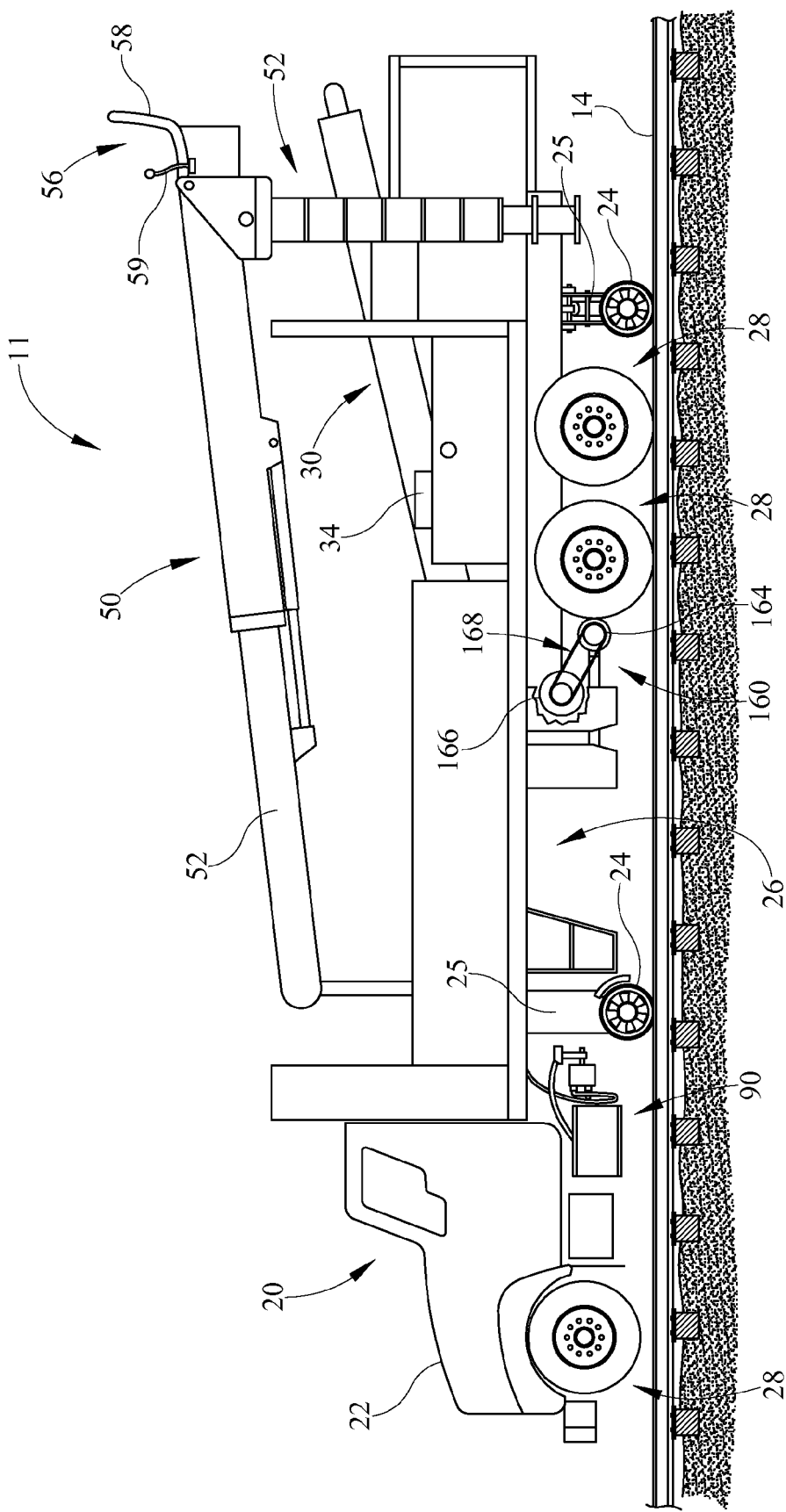
FIG. 4 is a side view of an alternative embodiment of a self-propel system for driving the high-rail vehicle along a railroad track.

Referring now to FIG. 4, an alternative embodiment of the high-rail vehicle 11 is depicted in side view. Similar to the embodiment of FIG. 3, the instant embodiment also utilizes an electrically or hydraulically powered self-propel system 160. According to this embodiment, the self-propel system 160 again comprises a friction wheel 164 which engages a wheel assembly 28. The friction wheel 164 may be moved to engage or disengage the wheel assembly 28. A motor 166 is positioned remotely from the friction wheel 164 and is operably connected by a transmission 168. The generator 34 powers the electric motor 166 or may be utilized to power a motor for a hydraulic pump in the event that the motor 166 is hydraulic. As a further alternative, the prime mover 22 may also power the pump to drive the hydraulic system 90. As depicted, the transmission 168 may be a chain drive or a belt drive system. In either case, a sprocket or sheave is placed on each of the motor pinion and friction wheel axle. Alternatively, a gear transmission, which includes two or more gears, may be utilized to interconnect the motor 166 and the friction wheel 164.

Once the high-rail vehicle 11 is placed on the rail 14, the rotation of the motor 166 causes rotation of the friction wheel 164 through transmission 168. This generates torque in the exemplary wheel assembly 28 which drives the high-rail vehicle along the track 14. As previously described, the high-rail vehicle 11 may be operated from the remote cab 56 once the vehicle is placed on the track 14. Thus the friction wheel 164 may be moved to engage or disengage the wheel assembly 28. As shown, the rail wheels 24 partially support the weight of the vehicle 11. The rear wheel assemblies 128 support the remaining portion of the vehicle weight. As depicted, the front wheel assembly of the vehicle 11 is elevated from the track since the rail wheels 24 guide the vehicle 11 along the track 14.

In the embodiments shown in FIGS. 3 and 4, the motors of the self-propel systems 60, 160 may be electric, and powered by a generator 34, although these systems may alternatively be hydraulic. These embodiments operate through the use of a friction roller to engage a wheel assembly 28. In one instance the system 60 comprises a motor in direct engagement with the friction roller 64. In a second instance, the system 160 comprises a motor indirectly engaged with the friction roller by means of a transmission 168 which may comprise a belt, chain or gear drive, or other known transmission systems. Further, these self-propel systems 60, 160 are engageable or disengageable from one of the wheel assemblies 28.

Figure 5:
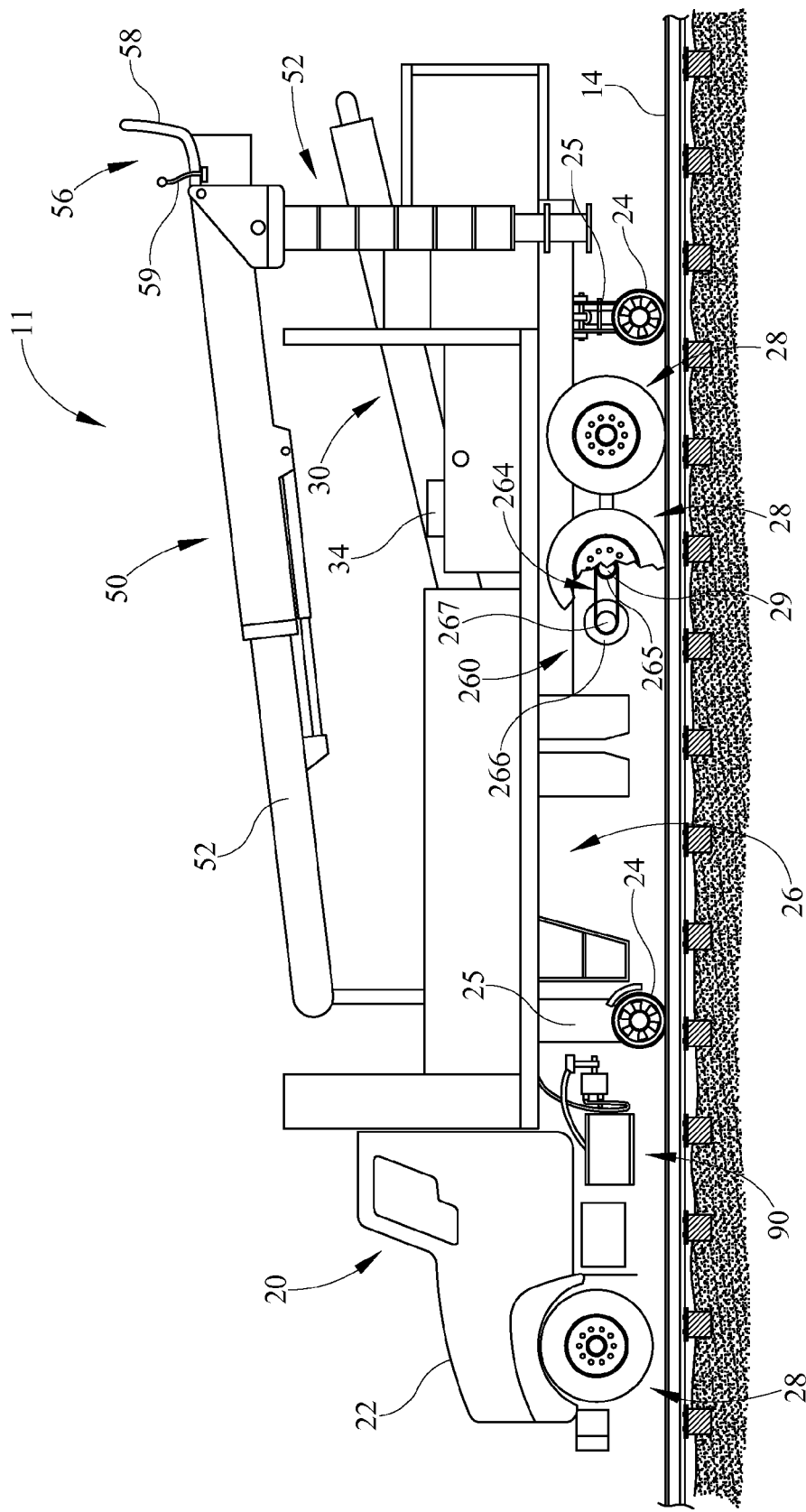
FIG. 5 is a side view of an additional alternative embodiment of a self-propel system for driving the high-rail vehicle along a railroad track.

Referring now to FIG. 5, the high-rail vehicle 11 is shown in side view positioned on track 14. The embodiment of FIG. 5 uses an alternative self-propel system 260. According to the embodiment shown, a motor 266 is connected to the chassis 26 or other structure depending therefrom. The motor 266 may be electric or hydraulic as previously described. A transmission 264 includes a sprocket 265 on the axle 29 or wheel assembly 28, a sprocket 267 on the motor 266 and a chain connecting the two. The transmission 264 may include a chain drive, belt drive, gear drive or other means for transmitting torque from the motor 266 to an axle 29 of the high-rail vehicle. Thus, the self propel system of the embodiment shown in FIG. 5 utilizes a motor to drive at least on axle 29 or wheel assembly 28 of the high-rail vehicle 11, but without the use of a friction roller. Additionally, the motor 266 may be electric wherein it is powered by the electric generator 34. Alternatively, the motor 266 may be hydraulic wherein such system is powered by the prime mover 22 or a generator.

Figure 6:
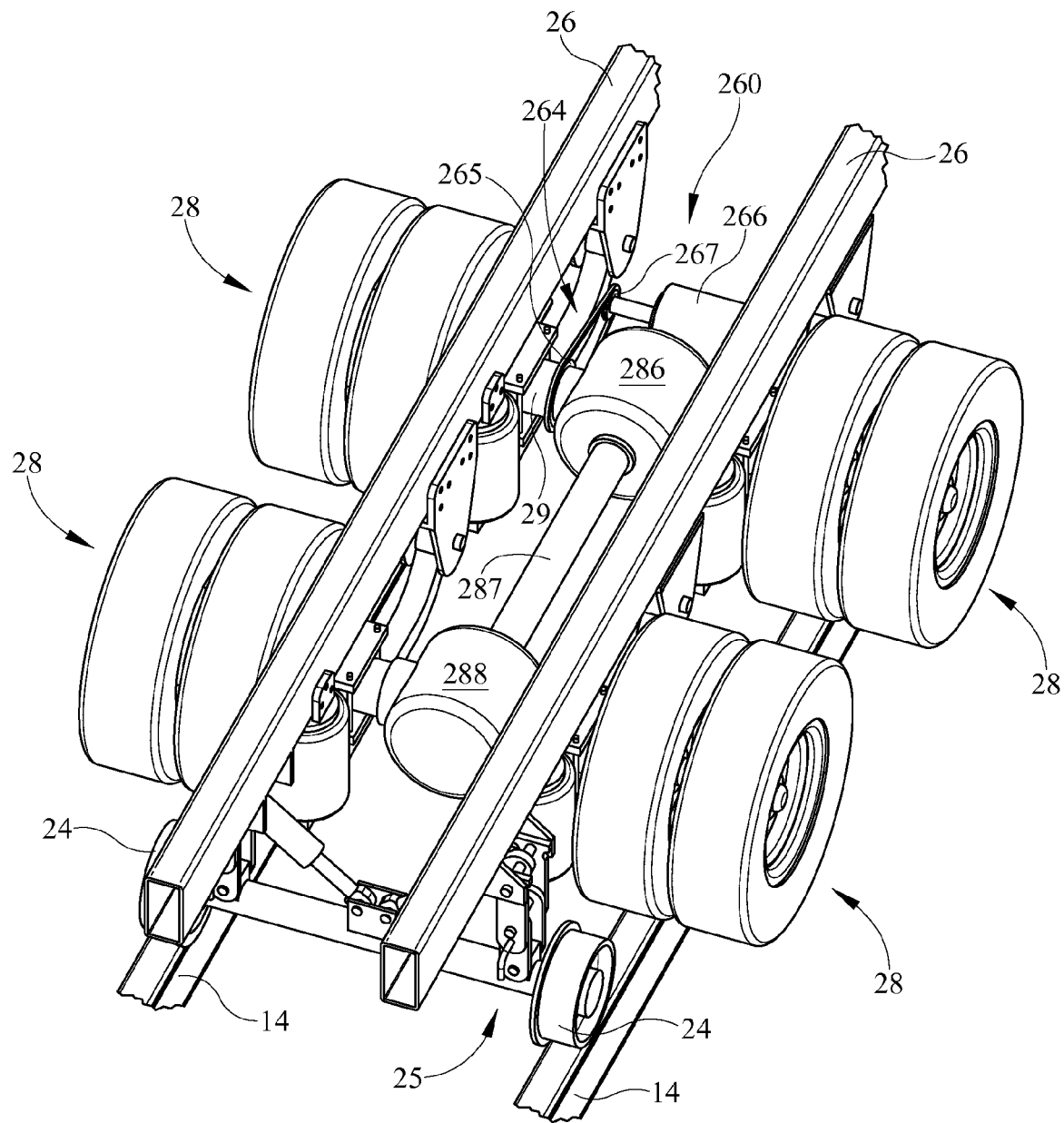
FIG. 6 is an upper perspective view of the chassis and self-propel system of FIG. 5.

Referring now to FIG. 6, an upper perspective view of portions of the self-propel system 260 are depicted. Depending downwardly from the chassis 26 are forward and rearward wheel assemblies 28, near the top of the page and bottom of the page respectively. Adjacent one of the wheel assemblies 28, for example the front wheel assembly 28, is a motor 266. In the exemplary embodiment, a hydraulic motor is utilized and is spaced from the axle 29 of the forward wheel assembly 28 depicted. In this embodiment, the transmission 264 includes a sprocket or sheave 267 on the motor 266 and a sprocket or sheave 265 positioned on the axle 29. As shown, the axle 29 is extending from a differential 286. Alternatively, however the sprocket or sheave 265 may be connected to the inside portion of the wheel assembly. In either event, torque created by the motor 266 is transmitted through transmission 264 to at least one wheel assembly 28. The operator need only place the high-rail vehicle transmission in neutral, once the vehicle is on the railroad track 14 and rail wheels 24 are deployed, before starting the self-propel system 260. Then the operator can direct the vehicle 11 along the rails 14 from the remote cab 56.

Figure 7:
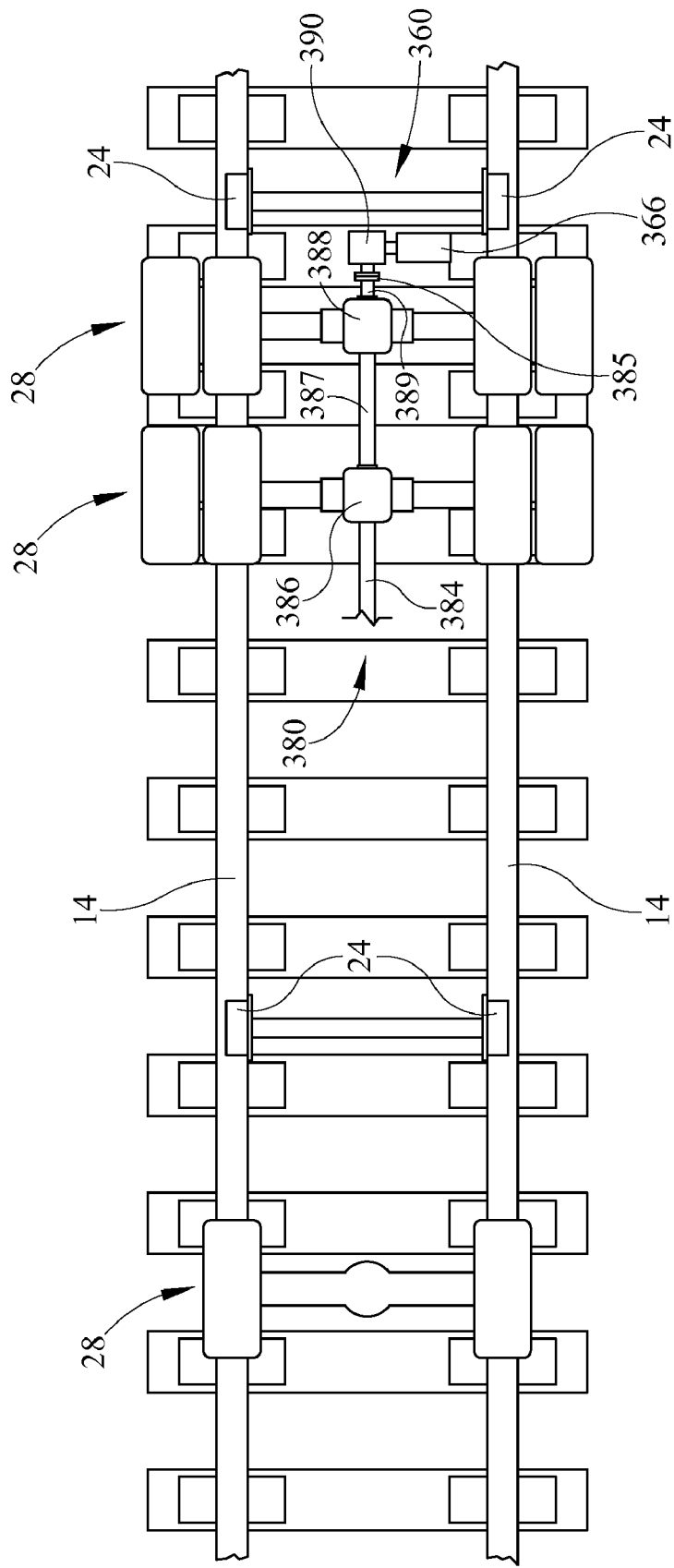
FIG. 7 is a top schematic view of a further alternative embodiment of a self-propel system for driving the high-rail vehicle along a railroad track.

Referring now to FIG. 7, an alternative embodiment is depicted in a generally schematic top view. The wheel assemblies 28 are shown positioned on the rails 14. Spaced forwardly from the rear wheel assemblies 28 is a prime mover 22 (FIG. 1) which inputs power to a drive train 380 which comprises a drive shaft 384, at least one differential 386, 388 and a connecting shaft 387. The rear wheel assemblies are driven by a drive shaft 384 which is connected to the prime mover 22 (FIG. 1). The drive shaft 384 connects to the first rear wheel assembly 28 at a first differential 386 to transmit torque from the prime mover 22. The rearward wheel assemblies 28 are connected to the adjacent wheel assemblies 28 by an intermediate drive shaft 387. Specifically, the intermediate drive shaft 387 connects the differential 386 to the second differential 388 allowing transmission of torque to the rearward wheel assemblies 28.

An additional drive shaft 389 connects the second differential 388 to a self-propel transmission 390. The exemplary embodiment depicts a right angle drive 390 which is connected to a motor 366, although alternate transmissions may be utilized or alternatively the motor 366 can be directly connected to the drive shaft 389. The motor may be electric or hydraulic. In the case of the electric motor, a generator 34 is utilized to drive the motor 366 push the high-rail vehicle 11 along the tracks 14. Alternatively, a hydraulic motor 390 may be utilized to drive the self-propel system 360. Specifically, in operation, the transmission connected to the prime mover 22 (FIG. 1) is disengaged by adjusting the transmission to neutral in the cab 22. Next, the hydraulic or electric motor 366 is started which provides an input torque to the self-propel system transmission 390. This torque is transmitted through the drive shaft 389 to at least one of the rear differential 388 and the differential 386 through drive shafts 389 and 387, respectively. With this torque, the vehicle is pushed along the rails 14 by at least one wheel assembly 28. A means for disengaging the motor 366 and/or transmission 390 from the differential 388 during normal on-road operation such as an automatic or manual clutch 385 may also be desirable and is well within the scope of the present invention.

Figure 8:
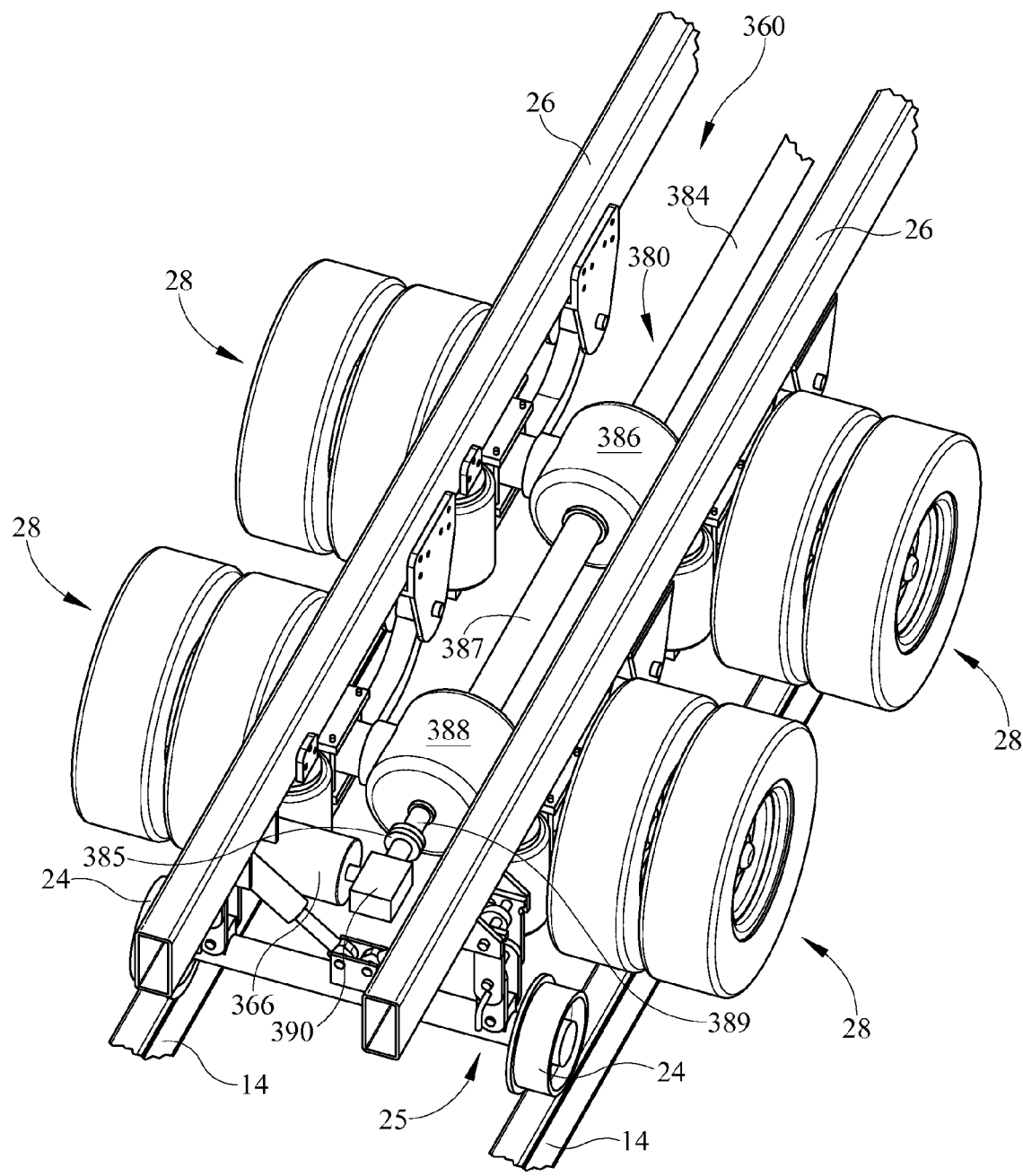
FIG. 8 is an upper perspective view of the chassis and self-propel system of FIG. 7.

Referring now to FIG. 8, an upper perspective view of the self-propel system 360 of FIG. 7 is depicted. The self-propel system 360 utilizes a plurality of wheel assemblies 28 which are interconnected by first and second differentials 386, 388 and a drive shaft 387. A main drive shaft 384 extends from the forward differential toward the prime mover 22 (FIG. 1). The embodiment shown in FIGS. 7 and 8 receives torque input from a motor 366 to power the vehicle 11 along the tracks 14 through at least one wheel assembly 28. The torque is passed through the at least one differential 388, 386 to power the at least one wheel assembly 28. The system is depicted with a right angle transmission 390 disposed between the motor 366 and the differential 388. However, as previously indicated, the motor may be directly connected to the input drive shaft 389. In comparison with the embodiment of FIGS. 5 and 6, the power input from the motor 366 in FIGS. 7 and 8 passes through a differential through the vehicle 11 drive train as opposed to being input directly to an axle 29.

Referring now to FIG. 9, a top schematic view of a further alternative embodiment is depicted. According to this embodiment, at least one of the rail wheels 24 is driven by a motor 466. The motor 466 is shown directly driving at least one rail wheel 24, as compared to the previous embodiments which drive a friction roller and wheel assembly 28 or drive a wheel assembly 28 through a differential 288,388.

Figure 10:
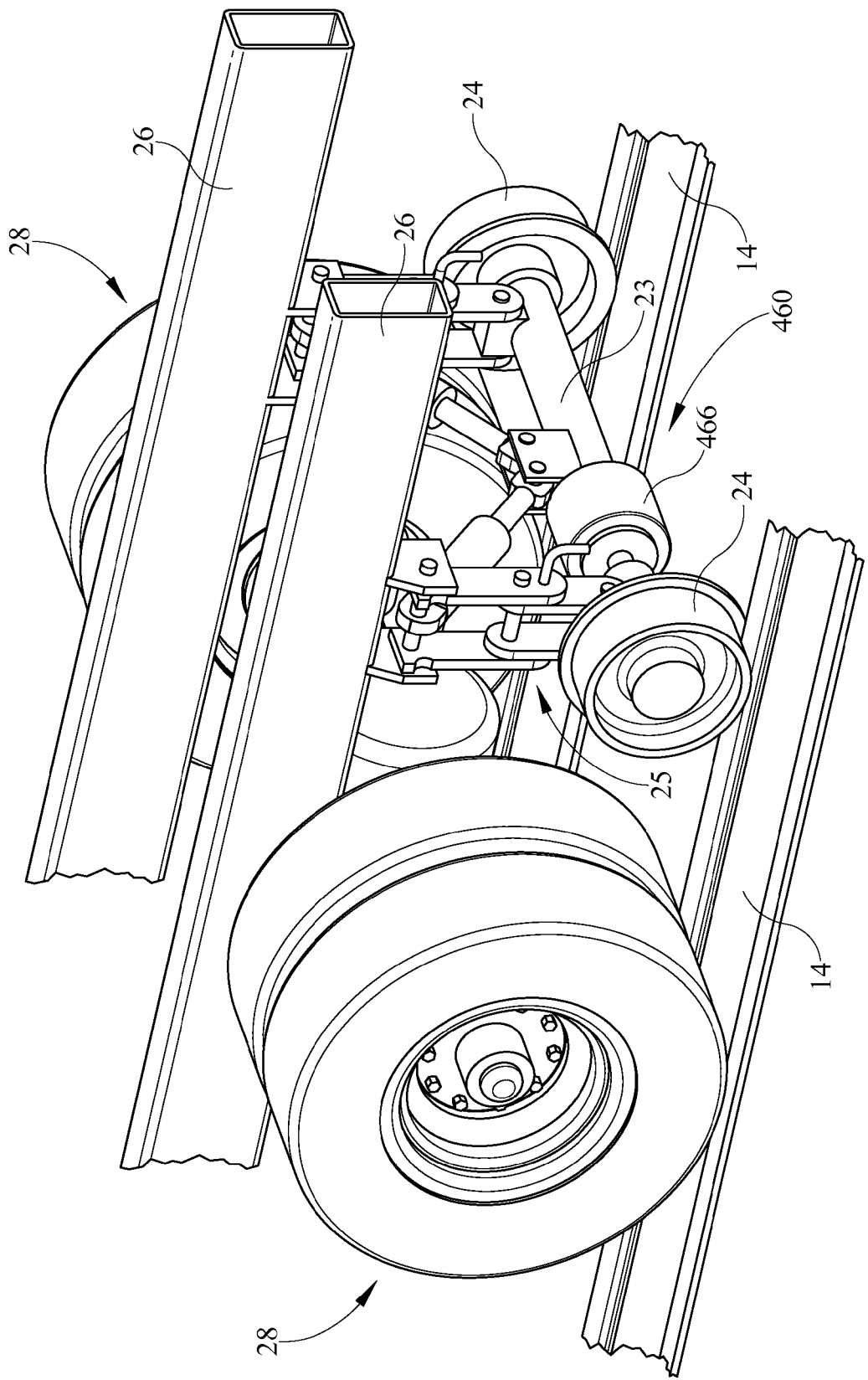
FIG. 10 is an perspective view of the chassis and self-propel system of FIG. 9.

Referring now to FIG. 10, the embodiment of FIG. 9 is depicted in a perspective view. The motor 466 is positioned in direct connection with a rail wheel 24. An axle 23 of the opposite rail wheel 24 may be connected to the motor housing in order to maintain alignment of these components, although such alignment is not necessary.

Figure 11:
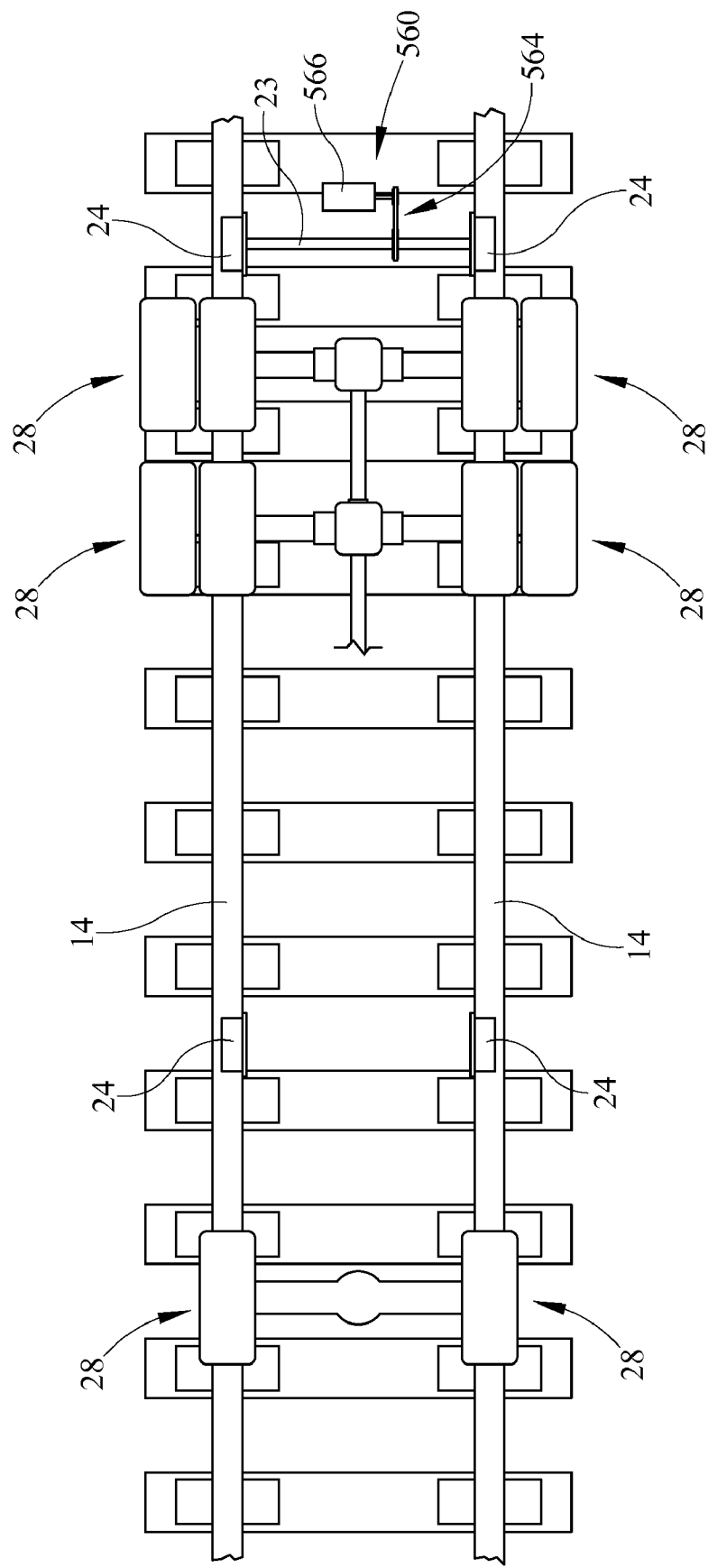
FIG. 11 is a top schematic view of yet a further alternative embodiment of a self-propel system for driving the high-rail vehicle along a railroad track.

Referring now to FIG. 11, a top schematic view of an additional alternative embodiment is shown. This embodiment also drives at least one rail wheel 24, instead of driving the wheel assemblies 28 via a friction roller or a via the transmission differentials 386,388. According to the embodiment of FIG. 11, the motor 566 may again be either electric or hydraulic and also is spaced from the axle 23. A transmission 564 is disposed between and operably connecting the motor 566 and the axle 23 in order to drive one or more of the rail wheels 24.

Figure 12:
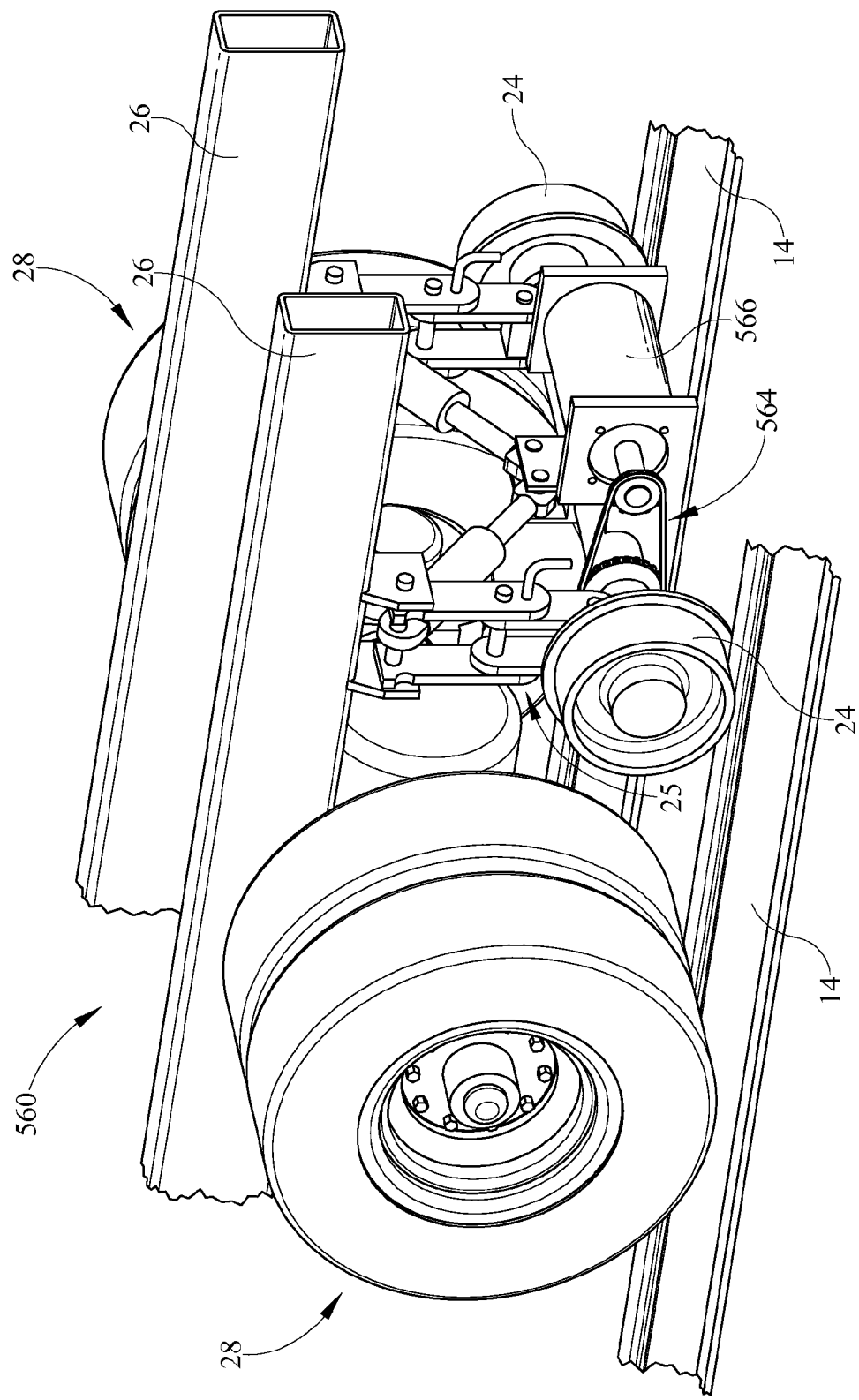
FIG. 12 is a perspective view of the chassis and self-propel system of FIG. 11.

Referring now to FIG. 12, a perspective view of the embodiment of FIG. 11 is depicted. The motor 566 is spaced apart from the rail wheels 24 and operably connected by the transmission 564. In the instant embodiment, first and second sprockets and a chain define the transmission 564. However, a belt drive utilizing sheaves and a belt may be used or alternatively a gear drive system may be used. With one sprocket connected to the axle 23, the speed or torque of the rail wheel 24 during operation may be adjusted by changing sprocket size of either the motor 566 or the axle 23.

Thus to distinguish the embodiments of FIGS. 9 and 10 from FIGS. 11 and 12, the former embodiment inputs motor torque directly into the rail wheel 24 or axle. The second embodiment inputs torque to the rail wheel by a transmission.

Figure 13:
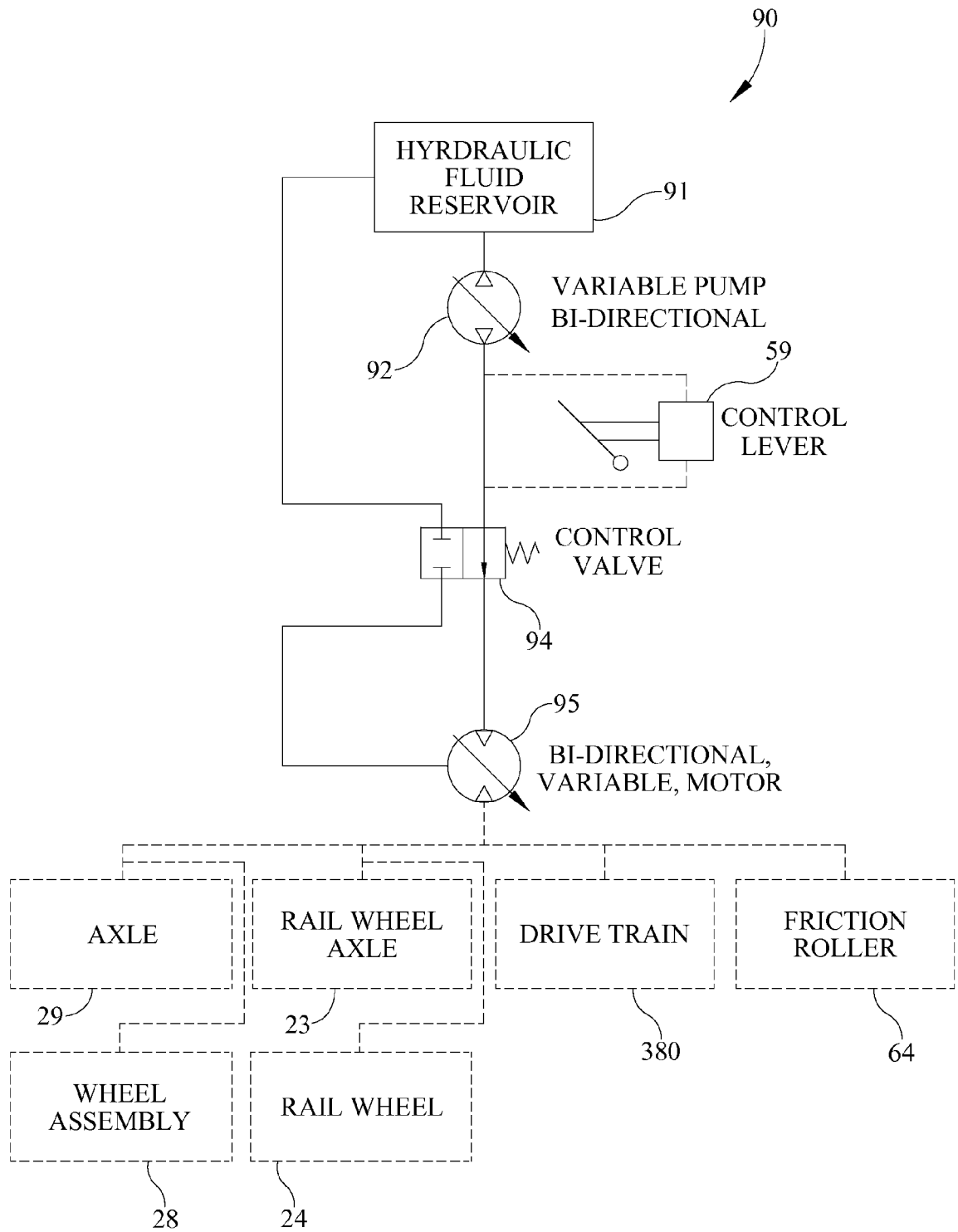
FIG. 13 is a schematic view of an exemplary hydraulic system which may be utilized to power the exemplary self-propel systems.

Referring now to FIG. 13, an exemplary hydraulic system 90 is depicted. The hydraulic system 90 includes a fluid reservoir 91 in fluid communication with a variable speed by directional pump 92. The pump 92 is in fluid communication with a control lever which is part of the control system 59. The control lever 59 is in communication with a control valve 94. The control valve 94 includes at least two fluid connections and lines extending to a bidirectional variable speed motor 95, for example. The bidirectional variable speed motor 95 has previously been referred to as numeral 66 or some series related thereto. The motor allows for two directions of rotation based on a position of a control valve 94. The hydraulic motor 95 may be connected to a plurality of the previously described embodiments, which are shown by a broken line. For example, the motor may be connected by transmission to axle 29 or wheel assembly 28. Alternatively, the motor 95 may be connected to rail wheel axle 23 or to a rail wheel 24. In either of these configurations, a transmission, such as transmission 564, may be utilized. Alternatively, the electric motor may be connected either directly or through a transmission to the drive train 380, as shown in FIGS. 6 and 8. In yet a further alternative, the motor 95 may be connected to the friction roller 64 either directly or through transmission.

Figure 14:
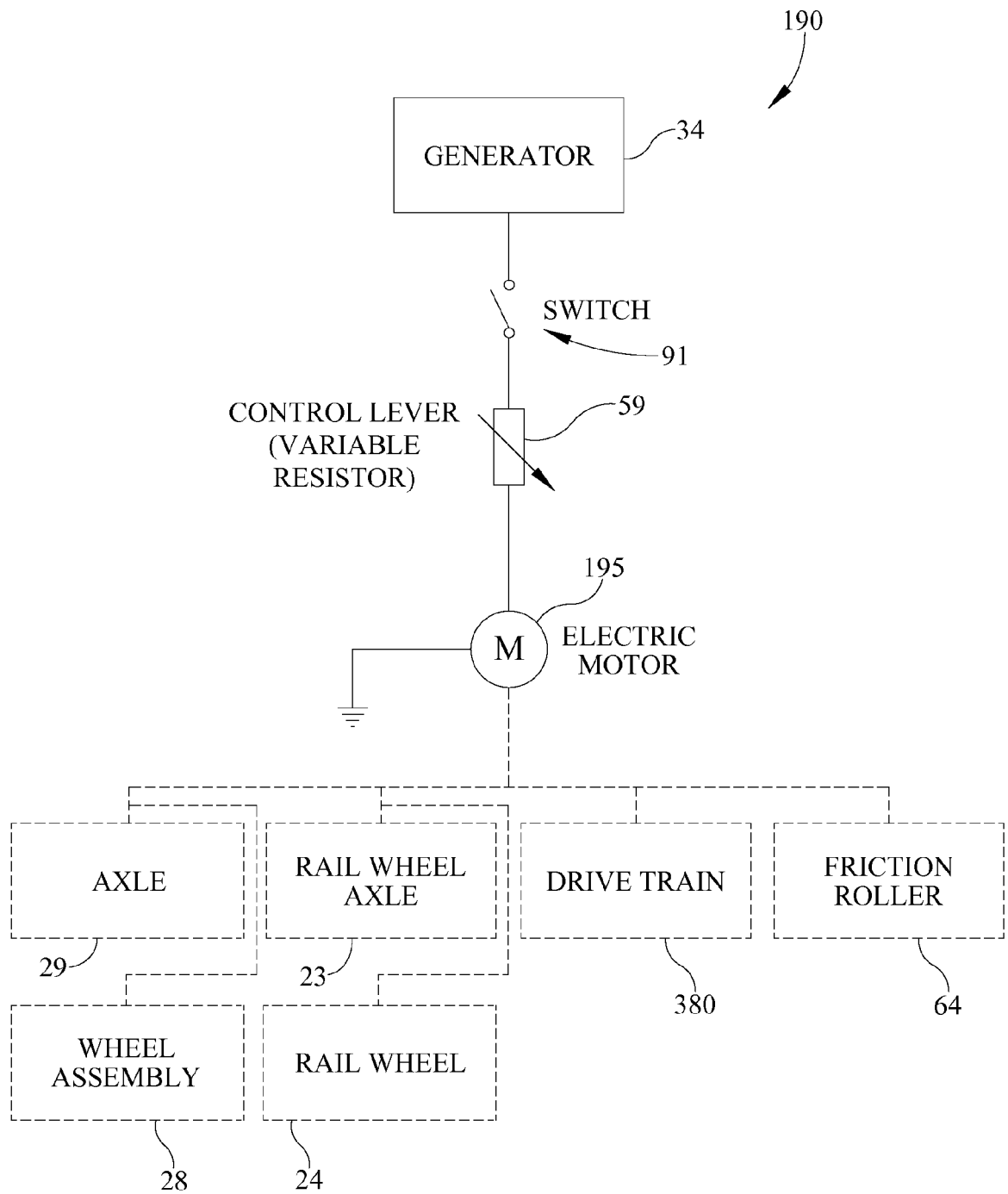
FIG. 14 is a schematic view of an exemplary electrical system which may be utilized to power the exemplary self-propel systems.

Referring now to FIG. 14, an alternative electric drive system is depicted in schematic view. A generator 34 is connected to a switch 91 which is also in electric communication with a variable resister control level, generally indicated by 59. The switch 91 and control lever 59 are in electric communication with an electric motor 195. The motor 195 has generally been referred to previously as motor 66 or some series related thereto. Connected to the electric motor 195 are various embodiments of the self-propel system previously described. For example, the electric motor 195 may be connected to the axle 29 through a transmission or may be connected to a wheel assembly 28. The electric motor alternatively may be connected to a rail wheel axle 23 either directly or by transmission or may be connected to a rail wheel 24. The electric motor 195 alternatively may be connected to a drive train 380. In yet another further alternative, the electric motor 195 may be connected either directly or by transmission to a friction roller 164.

Figure 15:
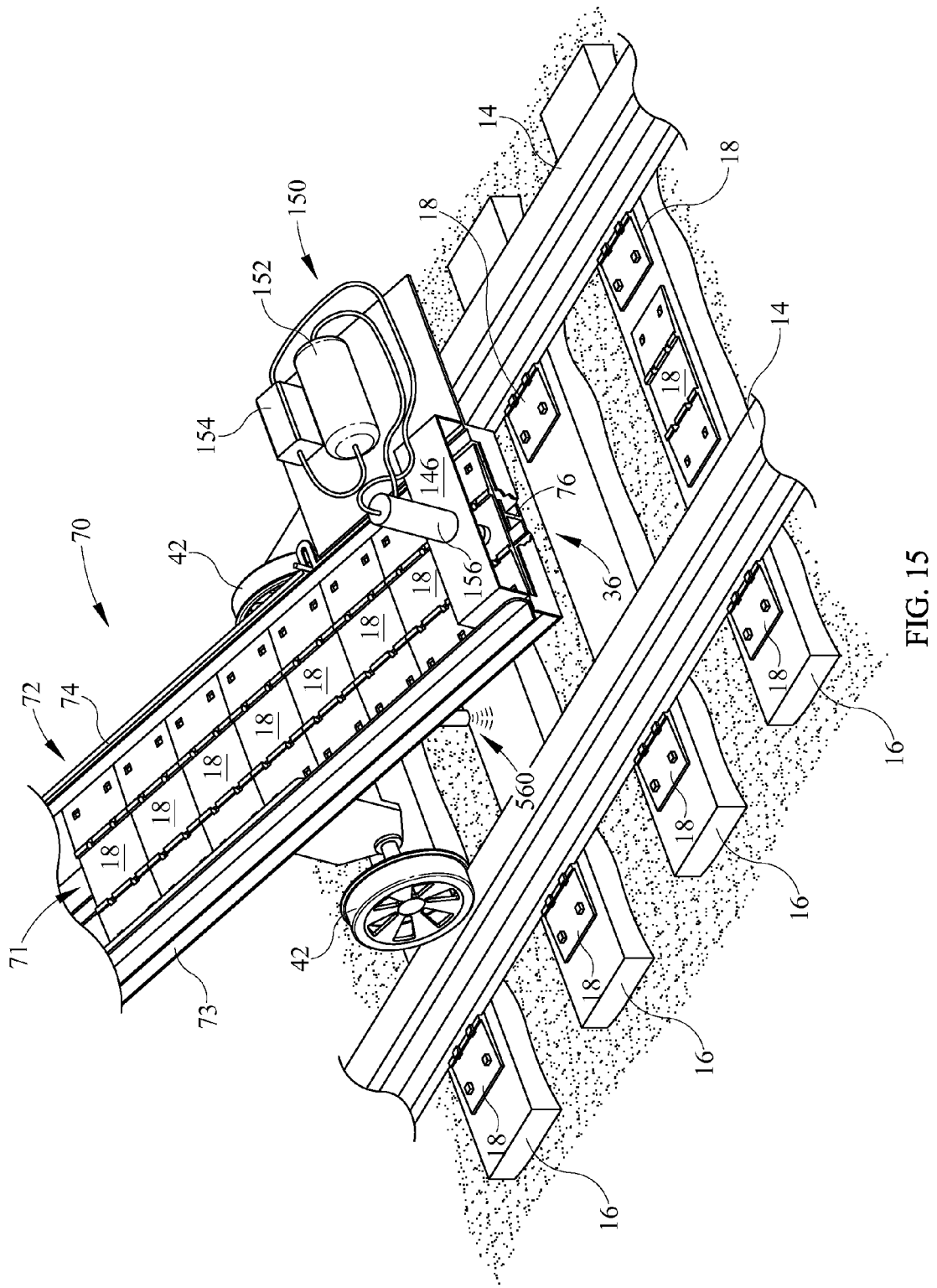
FIG. 15 is a perspective view of the tie plate slide conveyor with a first gate assembly.

Referring now to FIG. 15, the tie plate slide or conveyor is depicted by a tie plate slide structure 70. As previously described, prior art devices typically utilizes roller conveyors and belt type conveyors for feeding tie plates. In order to eliminate problems caused by dirt and contamination of rollers as well as belt wear and breakage, the tie plate slide 70 was developed. Tie plate slide conveyor 70 comprises a conveyor frame 72 having a first side portion 73, an opposite second side portion 74, and a center support structure 76. Each of the first and second portions 73,74 includes an upper end and a lower end. Along the length of the feed conveyor 70 is a wheel assembly including at least one rail wheel 42. This allows for support and rolling movement along the tracks or rails 14.

At a generally central position between the first and second portions 73,74 is the central support structure 76. The central support structure 76 extends from the upper end of the slide conveyor 70 to the lower end. The exemplary central support structure 76 is depicted as an I-beam. However, such embodiment should not be considered limiting as various types of central supports may be utilized which are generally spaced between first and second supports 73,74 and surfaces 73a, 74a. For example, a T-shaped structure, one or more angle irons, a flat plate which supports the tie plate 18 by either a surface or a straight edge. The upper elevation of the central support 76 is at the same elevation of first and second supports 73,74. This assures that all three points of contact are maintained. Alternatively, the central support could be slightly higher than the supports 73,74 or surfaces 73a,74a so that the surfaces merely inhibit tipping over the plates 18. However, where an I-beam structure is used, as in the exemplary embodiment, a single point of contact may be all that is necessary by the central support 76 if the beam is strong enough to support all of the tie plates 18. In such instance, the first and second supports 73,74 may only catch the tie plates 18 which tip to one side or the other.

In the exemplary embodiment, the central support 76 is separated from the first and second supports 73,74. This inhibits build up of contaminants which could hinder operation of the slide conveyor 70. Also, this eliminates weight from the conveyor which is otherwise unnecessary for support of the tie plates 18. Additionally, this construction eliminates moving parts which would otherwise have a propensity to fail or seize over time.

Referring still to FIG. 15, the tie plates 18 are received at the upper end from the vehicle 11 and slide downwardly along the slide conveyor 70 by gravity. The tie plates 18 generally have three points of contact with the slide conveyor 70. The tie plates 18 are generally supported at or near ends by the first and second frame members 73,74 and at a center position of the frame 72 by the center support structure 76. The present embodiment utilizes an alternative slide structure which eliminates the need for idler rollers or belt conveyor components. Thus, the tie plate slide 70 is less likely to be damaged by dirt and contaminants. The tie plate slide 70 may utilize various embodiments and structures in order to discharge tie plates 18. In the embodiment shown in FIG. 14, one gate assembly mechanism 150 is depicted. However, alternate designs may be utilized as described further herein.

Figure 16:
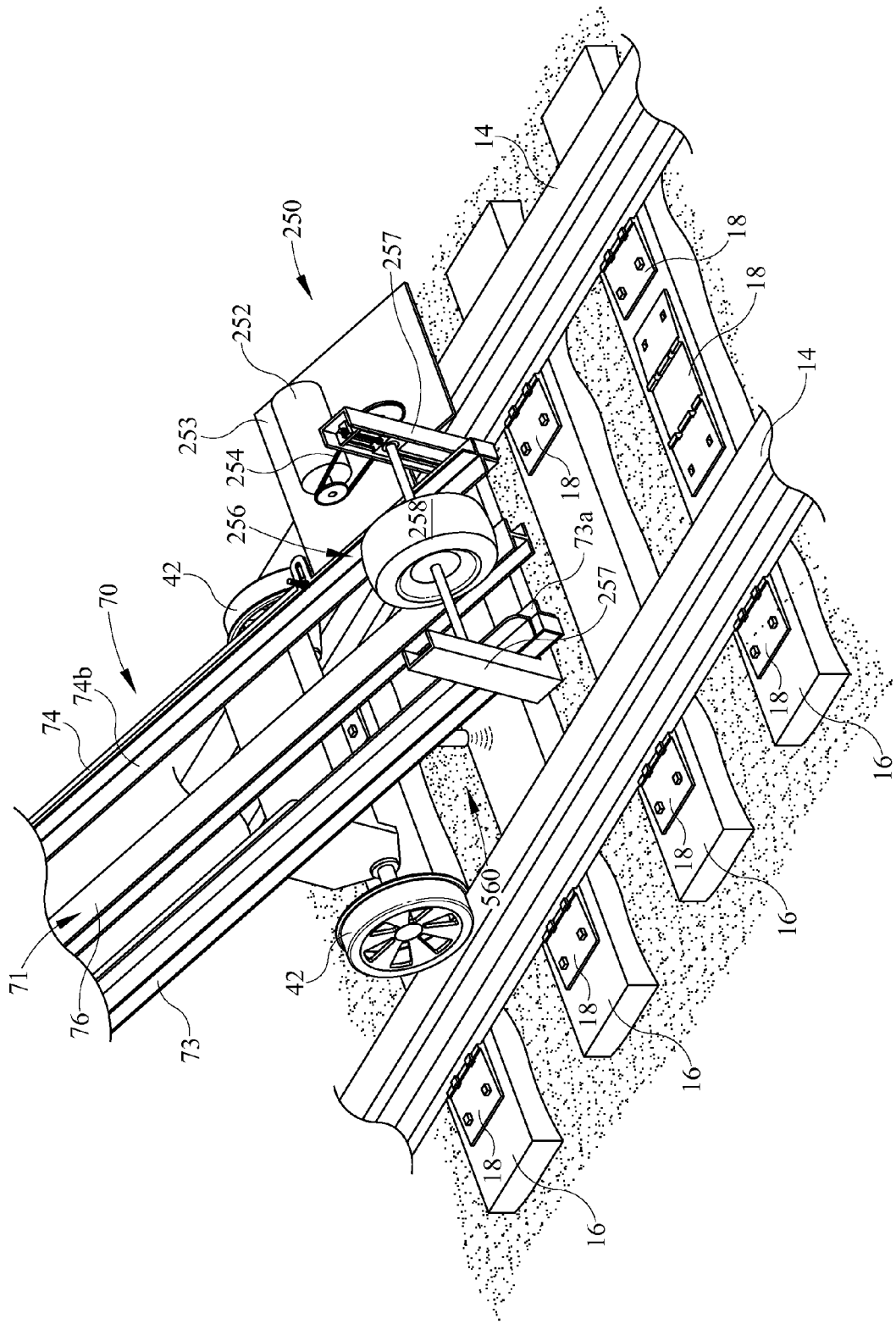
FIG. 16 is a perspective view of the tie plate slide conveyor with a second gate assembly; and, FIG. 17 is a side view of the tie plate slide conveyor of FIG. 16; and, FIG. 18 is a perspective view of the tie plate slide conveyor with a third gate assembly.

Referring now to FIG. 16, the tie plate slide 70 is shown in perspective view with the tie plates 18 removed. With the tie plates 18 removed, the center support structure 76 is shown formed by an I-beam structure. However, alternative shapes may be utilized as previously described. The first and second portions 73,74 and the central support 76 extend generally parallel from the upper portion of the slide 70 to a lower discharge area.

The tie plate slide 70 includes the first frame member 73 and the second frame member 74. With the tie plates 18 removed from the tie plate slide 70 the first frame member 73 includes a first slide surface 73a. This surface 73a is embodied by an angle iron which is affixed to the frame member 73. Similarly, the second slide member 74 includes a second slide surface 74a also affixed to the frame member to support ends of each tie plate 18. The slide surfaces 73a,74a have an upper surface at an elevation equivalent to the upper elevation of the central support structure 76. As previously indicated, the three point contact slide 70 eliminates the idler rollers and belts of the prior art thus eliminating structures which are likely to fail. Additionally, since the slide 70 includes gaps between the slide surfaces 73a,74a and center support 76, there is less friction that if a solid plate was used to define a chute down the slide path 71.

The slide 70 may be disposed at an angle to the horizontal which allows for sliding and overcomes the static friction of the tie plates 18. For example, the slide 70 may be in the range of from about 30 to about 80 degrees as measured from the horizontal. Although the system has only limited friction due to the limited areas of contact between the tie plates 18 and the slide 70, the friction may be greater than with an idler roller conveyor. Therefore, the angle of the slide 70 may be greater than that required for operation of a tie plate conveyor with rollers. Additionally, the members 73a,74a and the support structure 76 may have an upper surface which is either impregnated with a lubricant or includes a greased or otherwise friction reduced surface in order to aide sliding motion of the tie plates 18 downwardly along the slide 70. Thus, the angle of the tie plate slide 70 with respect to the ground below as well as the surface of the frame member 73,74 as well as the center support structure 76 all aide in providing proper feeding of the tie plates to the exemplary assembly 150.

The tie plate conveyor 70 may include various embodiments and may be utilized to discharge tie plates 18 from the slide conveyor 70 to the railroad ties 14 below. Referring again to FIG. 15, the slide conveyor 70 comprises an actuated slide gate assembly 150. In the exemplary slide gate assembly 150, a hydraulic motor 152 is in fluid communication with a control valve 154. The control valve 154 is in fluid communication with a hydraulic cylinder 156 from which a hydraulic piston extends. They hydraulic piston extends substantially perpendicular to the upper surface of the tie plate 18. The hydraulic cylinder is mounted on a frame 146 near the discharge end of the slide chute 70. When the piston is actuated to an extended position, it engages a tie plate at the end of the chute 70. However, when the piston is actuated to the retracted position, the bottom most tie plate 18 may be discharged. Upon discharge of a tie plate 18, the piston extends to allow only one plate 18 to pass at a time. Although a hydraulic system is described, a pressurized air system may be substituted to actuate a cylinder/piston device or other gate assembly.

Figure 17:
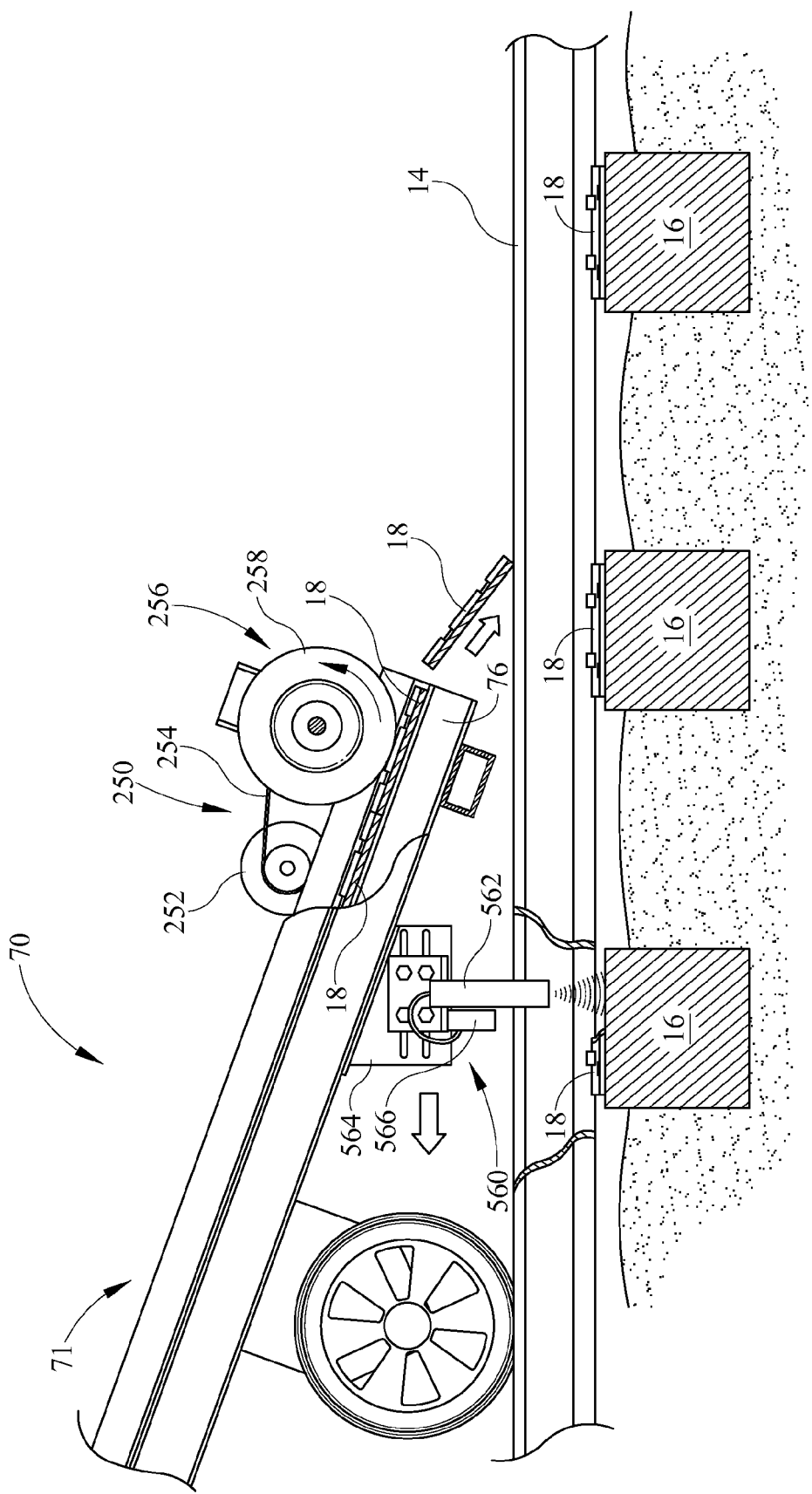

According to the embodiment of FIGS. 16 and 17, the tie plate slide 70 is depicted with an alternative feed assembly 250. The alternative assembly 250 comprises a small wheel or tire which rotates to discharge the tie plates 18 or stops rotation in order to halt the discharge. The assembly 250 utilizes a tire or wheel which is supported by an axle between support structures 257. The wheel 258 is rotatable by motor 252 which is connected to the axle of the wheel 258 by a transmission 258. As an alternative, the motor 252 may be directly connected to the axle of wheel 258.

In either of the feed assemblies 150, 250, a mechanism is utilized to signal the assemblies to discharge a tie plate 18. The sensor assembly 560 may be a laser sensor, optical sensor, density sensor or other such sensing device to detect, a speed, a distance moved, a time limitation, or which detects a change in material or detects a specific material, by any of various factors, such as color, texture, etc. With respect to feed assembly 250 for example, when the tie plate slide 70 is positioned over a tie 16, the wheel 258 is rotated a preselected angular velocity based on the known distance between the location of the sensor assembly 560 and the lower most end of the tie plate slide 70. The speed of the tie plate slide 70 may also be determined in various means, for example, by counting the revolutions of the rail wheels 42, or axle extending between the rail wheels 42. These factors either alone or in combination may affect the speed at which the tie plate 18 may be ejected by the assembly 250 onto a railroad tie 16. Moreover, other methods of determining velocity may be utilized and are well within the scope of the present invention. However, this is merely exemplary and various structures, programs, and processors may be utilized to compensate for speed of the slide conveyor 70, the distance between the end of slide conveyor 70 and the location of the sensor assembly 560.

As still a further alternative exemplary embodiment, the sensor assembly 560 may include a density sensor 562 which detects a change in density between the railroad ties 16 and the ballast surrounding the ties 16. When the sensor assembly 560 detects a tie 16, the sensor 562 signals a processor which causes a tie plate 18 to be ejected instantaneously or at a predetermined time interval based on speed, distance moved, distance of the sensor 562 from the end of the slide conveyor, any combination thereof or any other calculatable factors.

Referring now to FIG. 17, a side view of the embodiment of FIG. 16 is depicted. The tie plate slide 70 is shown with tie plates positioned along the center support structure 76. Beneath the tie plate slide 70 is the sensor assembly 560. The assembly may alternatively be any of the previously described sensor assemblies which depict either by laser, optically or detect density. Further, the assembly 560 may be defined by alternate types of sensors which have the capacity to detect the different between the ballast material and railroad ties 16. The sensor 562 may be in electrical communication with a processor 566 for signaling the gate assembly when a tie 16 is detected. Also, the assembly 560 may include a plate 566 which allows for adjustment of the sensor 562. This allows adjustment from the end of the slide 70 to the sensor for fine tuning.

Figure 18:
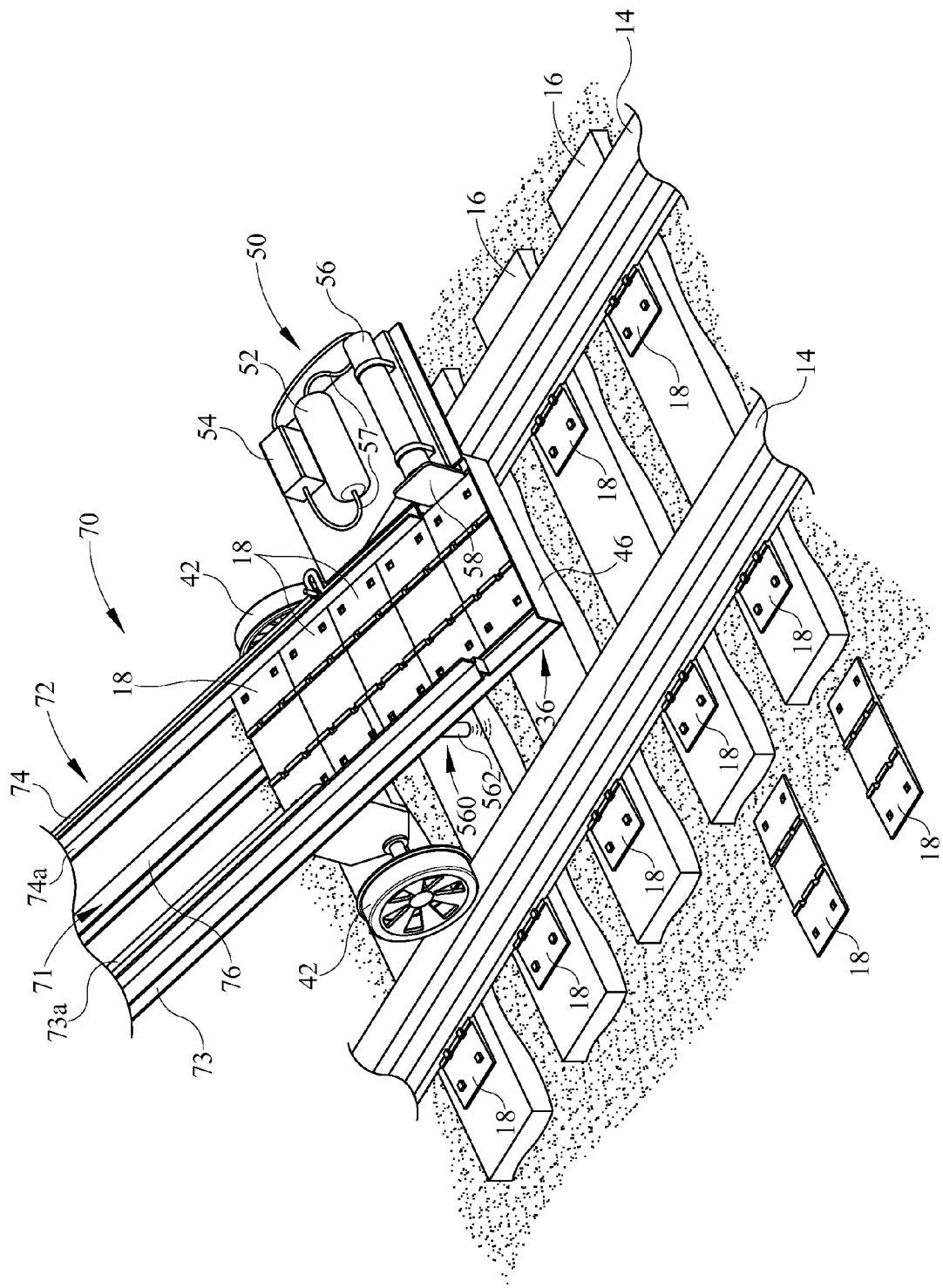

Referring now to FIG. 18, a perspective view of the tie plate slide 18 includes a gate assembly 50. The slide 70 is defined by first and second members 73, 74 which have slide surfaces 73a and 74a respectively, as previously described. The slide 70 also includes the central support structure 76 extending between and parallel to the first and second members 73,74 and defining a slide path 71. At a bottom end of the slide 70 is a stop 46 which inhibits the tie plates 18 from falling off of the lower end of the slide 70. The tie plate slide 70 includes an side discharge opening 36 adjacent the stop 70 and gate assembly 50. The gate assembly 50 includes a cylinder 56 and piston 58 which is actuated to push the lowermost tie plate 18 through the opening 36.

According to one embodiment, the gate assembly 50 includes a pump 52 and a control valve 54. The pump 52 may be hydraulic and the control valve 54 may control direction of flow to or from the cylinder 56. The components are connected by pressurized lines 57. Alternatively, the actuator 58 may be electrically actuated or actuated pneumatically.

In operation, the upper portion of the tie plate slide 70, the tie plates 18 are positioned in queue along the downwardly extending slide path 71. The tie plates 18 are at least partially supported by the central support 76. As the incoming rate of tie plates 18 is greater than the discharge rate at the gate assembly, for example gate assembly 250, the queue along the slide path 71 increases. As the rate of discharge of tie plates 18 from the gate assembly 250 increases, the queue will decrease. This increase or decrease in queue provides a buffer which compensates for problems in feeding so that if a feeding problem occurs at or above the tie plate slide 70, the entire tie plate distribution does not have to immediately stop. Instead the queue feeds out until it is exhausted or the feeding problem is corrected.

In feeding or discharging the tie plates 18, the sensor assembly 560 detects a railroad tie 16 and causes actuation, in the case of the exemplary gate assembly 250, the rotation of the tire 256 by way of the motor 252, transmission 254 and a controller. As the tire 258 rotates, the tie plates 18 are ejected as indicated, for example, in FIG. 17. Alternatively however, the tie plate discharge may occur by any of the gate assemblies described including, but not limited to, gate assemblies 50, gate assembly 150, and gate assembly 250.

The foregoing description of structures and methods has been presented for purposes of illustration. It is not intended to be exhaustive or to limit the invention to the precise steps and/or forms disclosed, and obviously many modifications and variations are possible in light of the above teaching. It is intended that the scope of the invention be defined by the claims appended hereto.

What is claimed is:

1. An auxiliary drive system for a high-rail vehicle, comprising:
    a high-rail vehicle having a first prime mover, a disengagable transmission, a chassis, a first set of on-road wheel assemblies and a second set of rail wheels;
    a primary cab for controlling said high-rail vehicle on road;
    a remote cab spaced from said primary cab, said remote cab allowing for control of said high-rail vehicle on railroad tracks;
    a secondary drive assembly comprising one of a hydraulic motor or an electric motor;
    said secondary drive assembly being connected to and driving one of an output axle extending from a differential, a wheel assembly or into said differential for inputting power into a drive train;
    and,
    said secondary drive assembly operable from said remote cab to move said high-rail vehicle along said railroad tracks when said transmission is in a disengaged position.

2. The auxiliary drive system of claim 1, further comprising a generator for use when said secondary drive assembly comprises an electric motor.

3. The auxiliary drive system of claim 1, further comprising a friction roller slidably engageable with one of said first on-road wheel assemblies.

4. The auxiliary drive system of claim 1, said one of said hydraulic or electric motor directly engaging said friction roller.

5. The auxiliary drive system of claim 1, said secondary drive assembly further comprising a second transmission.

6. The auxiliary drive system of claim 5, said second transmission operably connecting to said one of a hydraulic or an electric motor.

7. The auxiliary drive system of claim 5, said second transmission being a chain drive.

8. The auxiliary drive system of claim 5, said second transmission being a gear drive.

9. The auxiliary drive system of claim 5, said second transmission being a belt drive.

10. An auxiliary drive system, comprising
    a high-rail vehicle having a cab, a chassis, a plurality of road wheels disposed on said chassis, a transmission and a prime mover for highway operation;
    a remote cab, spaced from said primary cab for controlling said high-rail vehicle when said vehicle is disposed on a railroad;
    an auxiliary drive assembly having one of a hydraulic motor or an electric motor controllable from said remote cab;
    said auxiliary drive assembly providing an input at one of a differential, a differential output axle or one of said plurality of road wheels;
    said one of a hydraulic or electric motor driving at least one of said plurality of road wheels when said transmission is disengaged from said prime mover; and,
    a plurality of rail wheels depending from said chassis.

11. The auxiliary drive system of claim 10, said one of a hydraulic motor or electric motor directly connected to an axle connected to said at least one of said plurality of wheels.

12. The auxiliary drive system of claim 10, said one of a hydraulic motor or electric motor spaced from an axle connected to said at least one of said plurality of wheels.

13. The auxiliary drive system of claim 12, said one of a hydraulic or electric motor connected by an auxiliary transmission to one of said differential output axle or said one of said plurality of wheels.

14. The auxiliary drive system of claim 13, said transmission being one of a chain drive, a belt drive, a gear drive, and a fluid drive.

15. The auxiliary drive system of claim 10, said differential having a power take off.

16. The auxiliary drive system of claim 15, said one of a hydraulic motor or an electric motor connected to said power take off.

17. The auxiliary drive system of claim 16, said one of a hydraulic motor or electric motor driving said at least one of said plurality of wheels.

18. The auxiliary drive system of claim 10 further comprising a friction roller.

19. The auxiliary drive system of claim 18, said friction roller operably connected to said one of a hydraulic motor or electric motor.

20. The auxiliary drive of claim 19, said friction roller directly connected to said one of a hydraulic motor or electric motor.

21. The auxiliary drive of claim 19, said friction roller operably connected to said one of a hydraulic motor or electric motor by a secondary transmission.

22. The auxiliary drive system of claim 21, said secondary transmission being one of a belt drive, a gear drive, or a chain drive.

23. An auxiliary drive system, comprising:
a high-rail vehicle having a prime mover, a chassis, a first plurality of on-road wheels, a second plurality of rail wheels, a first transmission engageable between said prime mover and said first plurality of on-road wheels;
a secondary drive assembly for driving said high-rail vehicle along railroad tracks;
said secondary drive assembly controllable from a remote cab on said high-rail vehicle;
said secondary drive assembly comprising one of a hydraulic motor and an electric motor; and,
said secondary drive assembly engaging a drive train at one of an axle extending from a differential, said differential or at least one of said first plurality of on-road wheels for driving said at least one of said first plurality of on-road wheels, when said transmission is in a neutral position.

24. The auxiliary drive system of claim 23, said secondary drive assembly further comprising a secondary drive transmission operably connected to said one of a hydraulic motor and said electric motor.

25. The auxiliary drive system of claim 24, said secondary drive transmission being one of a chain drive, a belt drive, and a gear drive.

* * * * *